(12) United States Patent
Phan et al.

(10) Patent No.: US 9,902,495 B2
(45) Date of Patent: Feb. 27, 2018

(54) DATA CENTER POWERED BY A HYBRID GENERATOR SYSTEM

(71) Applicant: Top Flight Technologies, Inc., Malden, MA (US)

(72) Inventors: Long N. Phan, Somerville, MA (US); Samir Nayfeh, Shrewsbury, MA (US); John J. Polo, Simpsonville, SC (US); Eli M. Davis, Cambridge, MA (US); Paul A. DeBitetto, Concord, MA (US)

(73) Assignee: Top Flight Technologies, Inc., Malden, MA (US)

( * ) Notice: Subject to any disclaimer, the term of this patent is extended or adjusted under 35 U.S.C. 154(b) by 0 days.

(21) Appl. No.: 15/594,255

(22) Filed: May 12, 2017

(65) Prior Publication Data

US 2017/0327224 A1 Nov. 16, 2017

Related U.S. Application Data

(60) Provisional application No. 62/335,938, filed on May 13, 2016, provisional application No. 62/339,347, filed on May 20, 2016.

(51) Int. Cl.
*B64C 39/02* (2006.01)
*B64D 47/08* (2006.01)
*G08G 5/00* (2006.01)

(52) U.S. Cl.
CPC ............ *B64C 39/024* (2013.01); *B64D 47/08* (2013.01); *G08G 5/0039* (2013.01);
(Continued)

(58) Field of Classification Search
CPC ..... B64C 39/024; B64D 47/08; G08G 5/0039
See application file for complete search history.

(56) References Cited

U.S. PATENT DOCUMENTS

| 9,305,280 B1 | 4/2016 | Berg et al. |
| 2007/0131822 A1* | 6/2007 | Stallard ................ G05D 1/0297 244/190 |

(Continued)

FOREIGN PATENT DOCUMENTS

WO    WO 2015/138217    9/2015

OTHER PUBLICATIONS

International Search Report and Written Opinion for App. Ser. No. PCT/US17/32506, dated Sep. 15, 2017, 13 pages.

*Primary Examiner* — Basil T. Jos
(74) *Attorney, Agent, or Firm* — Fish & Richardson P.C.

(57) ABSTRACT

An unmanned aerial vehicle includes at least one rotor motor configured to drive at least one propeller to rotate. The unmanned aerial vehicle includes a data center including a processor; a data storage component; and a wireless communications component. The unmanned aerial vehicle includes a hybrid generator system configured to provide power to the at least one rotor motor and to the data center, the hybrid generator system including a rechargeable battery configured to provide power to the at least one rotor motor; an engine configured to generate mechanical power; and a generator motor coupled to the engine and configured to generate electrical power from the mechanical power generated by the engine. The data center may include an intelligent data management module configured to control power distribution and execution of mission tasks in response to available power generation and mission task priorities.

23 Claims, 28 Drawing Sheets

(52) U.S. Cl.
CPC .. *B64C 2201/027* (2013.01); *B64C 2201/042* (2013.01); *B64C 2201/108* (2013.01); *B64C 2201/125* (2013.01); *B64D 2221/00* (2013.01)

(56) References Cited

U.S. PATENT DOCUMENTS

2016/0114888 A1    4/2016  Downey et al.
2017/0008627 A1*  1/2017  de Soto ................ B64C 39/024

* cited by examiner

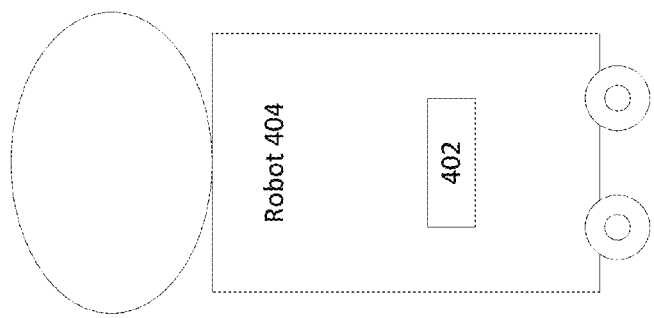
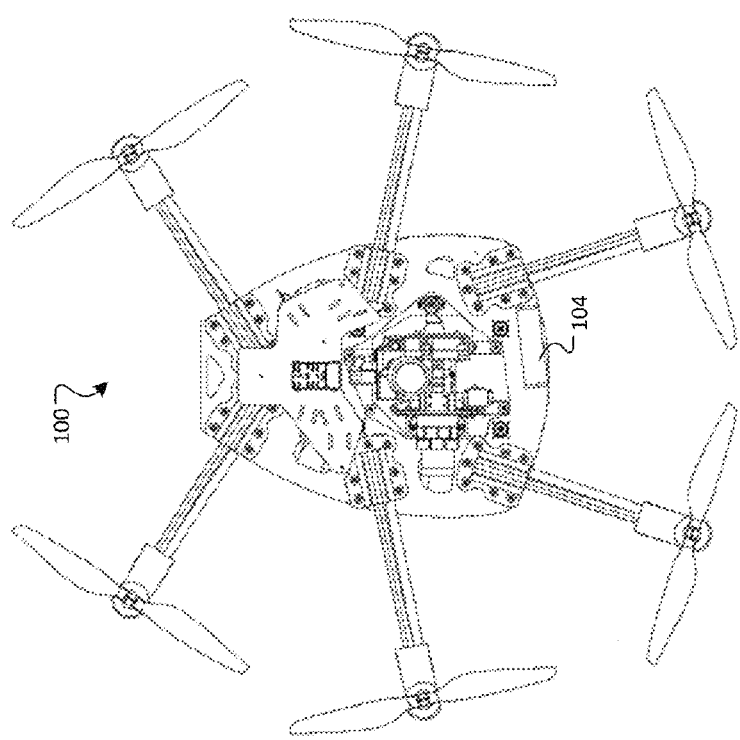
Fig. 4

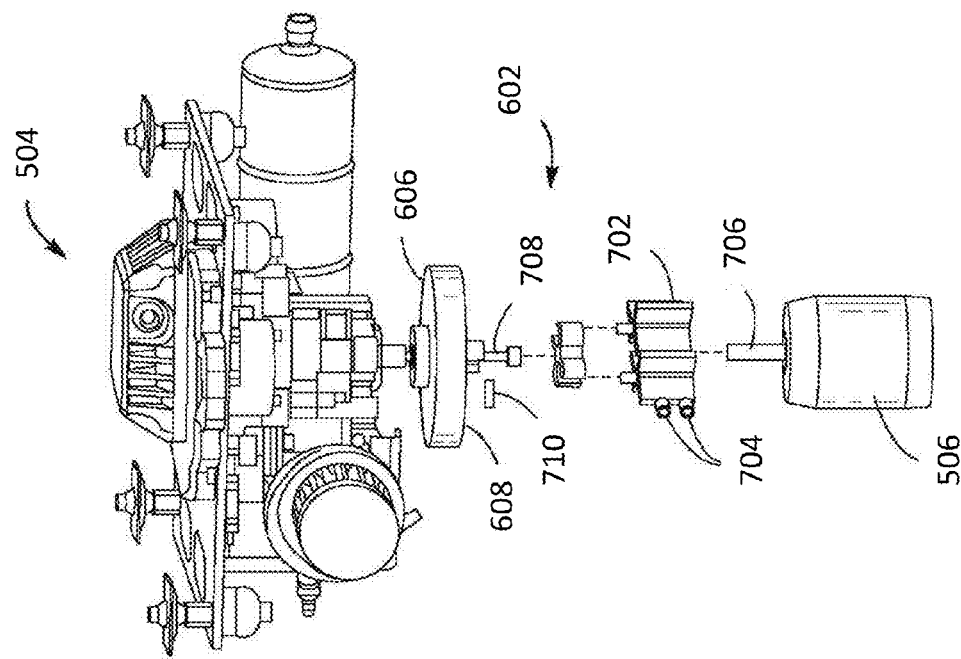
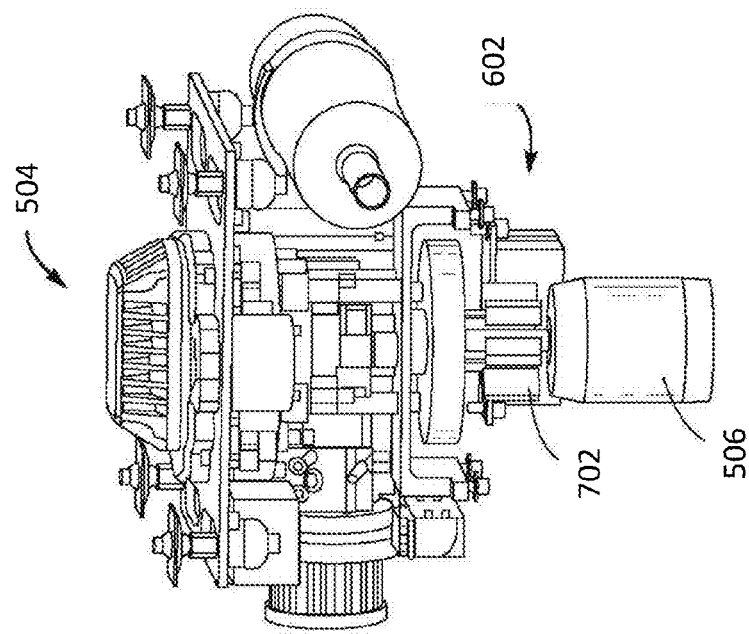
Fig. 7B
Fig. 7A

DATA CENTER POWERED BY A HYBRID GENERATOR SYSTEM

CLAIM OF PRIORITY

This application claims priority to U.S. Patent Application Ser. No. 62/335,938, filed on May 13, 2016, and to U.S. Patent Application Ser. No. 62/339,347, filed on May 20, 2016, the contents of both of which are incorporated here by reference in their entirety.

BACKGROUND

A multi-rotor unmanned aerial vehicle (UAV) may include rotor motors, one or more propellers coupled to each rotor motor, electronic speed controllers, a flight control system (auto pilot), an remote control (RC) radio control, a frame, and a rechargeable battery, such as a lithium polymer (LiPo) or similar type rechargeable battery. Multi-rotor UAVs can perform vertical take-off and landing (VTOL) and are capable of aerial controls with similar maneuverability to single rotor aerial vehicles.

SUMMARY

In a general aspect, an unmanned aerial vehicle includes at least one rotor motor configured to drive at least one propeller to rotate. The unmanned aerial vehicle includes a data center including a processor; a data storage component; and a wireless communications component. The unmanned aerial vehicle includes a hybrid generator system configured to provide power to the at least one rotor motor and to the data center, the hybrid generator system including a rechargeable battery configured to provide power to the at least one rotor motor; an engine configured to generate mechanical power; and a generator motor coupled to the engine and configured to generate electrical power from the mechanical power generated by the engine.

In a general aspect, an unmanned aerial vehicle includes at least one rotor motor configured to drive at least one propeller to rotate. The unmanned aerial vehicle includes a data center including a processor; a data storage component; and a wireless communications component. The unmanned aerial vehicle includes a hybrid generator system configured to provide power to the at least one rotor motor and to the data center, the hybrid generator system including a rechargeable battery configured to provide power to the at least one rotor motor; an engine configured to generate mechanical power; and a generator motor coupled to the engine and configured to generate electrical power from the mechanical power generated by the engine.

One example of the present disclosure is an unmanned aerial vehicle including at least one rotor motor configured to drive at least one propeller to rotate, a data center, and a hybrid generator system configured to provide power to the at least one rotor motor and to the data center. The data center includes a processor, a data storage component, and a wireless communications component. The hybrid generator system includes a rechargeable battery configured to provide power to the at least one rotor motor, an engine configured to generate mechanical power, and a generator motor coupled to the engine and configured to generate electrical power from the mechanical power generated by the engine.

In some implementations, the wireless communications component is configured to communicate with a separate aerial vehicle having a wireless communication component and a processor and operate as a node in a mesh network including the unmanned aerial vehicle and the separate aerial vehicle.

In some implementations, the unmanned aerial vehicle and the separate aerial vehicle are configured to share data to form a cloud computing cluster.

In some implementations, the wireless communications component is configured to communicate with a ground-based device having a wireless communication component and a process and operate as a node in a mesh network including the unmanned aerial vehicle and the ground-based wireless communication device. In some instances, the unmanned aerial vehicle and the ground-based device are configured to share data to form a cloud computing cluster.

In some implementations, the vehicle includes a sensor configured to collect data, and the data storage component is configured to store the data collected by the sensor. In some instances, the sensor includes one or more of the following: a weather sensor, a temperature sensor, a pressure sensor, and a camera. In some instances, the processor is configured to process the collected data.

In some implementations, the data center includes an intelligent data management module configured to control power consumption of the data center based on the power available from the hybrid power generation system. In some implementations, the data center is configured to execute a data task and the intelligent data management module is configured to control a power consumption of the data center allocated for the data task based the power available from the hybrid power generation system. In some instances, the data storage component is configured to store data indicative of one or more mission objectives and the intelligent data management module is configured to control the power consumption of the data center allocated for the data task based on the power available from the hybrid power generation system and the stored data indicative of the one or more mission objectives. In some instances, the data indicative of the one or more mission objectives includes at least one of: a data processing task, a data collection task, and a flight profile, and the intelligent data management module is configured to control the power consumption of the data center based on the data indicative of the one or more mission objectives and the power available from the hybrid power generation system.

In some implementations, the intelligent data management module is configured to control the power consumption of the data center allocated for the processing task based on one more of the following: a flight mode, a vehicle fuel level, and a battery status. In some implementations, the intelligent data management module is configured to control the power consumption of the data center by delaying the performance of the data task until the power available from the hybrid power generation system increases.

Another example of the present disclosure is a method including operating a hybrid power generation system to provide power to a rotor motor of an unmanned aerial vehicle and to a data center module of the unmanned aerial vehicle, operating the data center module to perform a data task using the power provided to the data center module, the data task including one or more of data processing and data collection, receiving an indication of the power available from the hybrid power generation system, and controlling a power allocation to the data center module based on the indication of the power available.

In some implementations, the method includes receiving a priority measure of the data task, and controlling the power allocation to the data center module is further based on the priority measure of the data task. In some implementations, the method includes determining the priority measure of the data task. In some instances, the data task is a first data task having a first priority measure, and the method includes operating the data center module to perform a second data task e using the power provided to the data center module, the first and second data tasks consuming respective first and second amounts of power, and controlling the power allocation to the data center module for the first and second data tasks based on the indication of the power available and a priority measure of the second data task and the priority measure of the first data task.

In some implementations, the method includes receiving a fuel status representing an amount of fuel in the unmanned vehicle, the fuel being used to power the hybrid power generation system, receiving an indication of an amount of power provided to the rotor motor, and estimating the remaining flight time of the unmanned aerial vehicle based on the fuel status, the indication of the amount of power provided to the rotor motor, and the power allocation.

In some implementations, the method includes receiving a mission objective including one or more of: a flight plan for the unmanned aerial vehicle and a list of one or more data tasks to be performed by the data center module during the flight plan, and estimating the remaining flight time of the unnamed vehicle based on the fuel status, the generator system status, the power allocation, and the mission objective. In some instances, the method includes updating one or more of the flight plan and the list of one or more data tasks based on the estimated remaining flight time. In some instances, the method includes controlling the power allocation based on the estimated remaining flight time.

Yet another example of the present disclosure is a system for operating an unmanned aerial vehicle. The system includes a propulsion system configured to provide lift and propulsion for the unmanned aerial vehicle, a flight management system configured to control the propulsion system, a data center module configured to execute one or more data tasks, each data task including one or more of data processing and data collection, a mission management system configured to provide instruction to the flight management system for flying the unmanned aerial vehicle and to control operation of the data center module, a hybrid power generation system configured to provide power to the propulsion system and to the data center module, and an intelligent data management system configured to be responsive to the flight management system and the mission management system to control the allocation of power to the data center module based on a priority of each data tasks and an availability of the power from the hybrid power generation system.

In some implementations, the hybrid generator system includes a rechargeable battery configured to provide the power to the propulsion system, an engine configured to generate mechanical power, and a generator motor coupled to the engine and configured to generate the electrical power from the mechanical power generated by the engine.

BRIEF DESCRIPTION OF THE DRAWINGS

FIG. 4 is a diagram of a robot and a UAV, both with a data center.

FIG. 7A depicts a side view of a hybrid generator.
FIG. 7B depicts an exploded side view of a hybrid generator.

DETAILED DESCRIPTION

We describe here an unmanned aerial vehicle (UAV) powered by a hybrid generator and that can perform data center operations. A data center is a facility that houses computing system components, such as processors, data storage components, communications components, and/or other computing system components. In some examples, a data center, such as a data center housed on a UAV, can provide data storage and/or data processing capabilities for Internet applications, e.g., to act as a server for hosting one or more web sites or Internet-based services. In some examples, a data center, such as a data center housed on a UAV, can provide data storage and/or data processing capabilities for cloud computing applications.

A UAV powered by a hybrid power generation system often has ample power on board to carry out additional tasks, such as data processing and/or data collection tasks. Such UAVs can thus carry out various types of missions involving various data processing and/or data collection capabilities. In some flight modes, such as when the UAV is taking off, landing, or hovering, or operating in challenging environmental conditions, power can be primarily allocated to flight critical components to help ensure safe and stable UAV operation. In some flight modes, such as when the UAV is in forward flight, additional power can be allocated to data processing and/or data collection tasks. The allocation of power between flight critical components and data processing and/or data collection tasks can sometimes also be based on the priority of the data processing and/or data collection tasks. For instance, if a data processing or data collection task is specific to a particular location (e.g., a mapping survey of a particular geographical region), that task may continue to receive preferential power allocation even in the face of challenging environmental conditions or when the UAV is hovering. If a data processing or data collection task is less location-specific (e.g., processing of previously collected data), power may be allocated for the task only under certain flight conditions.

Figure 1A:
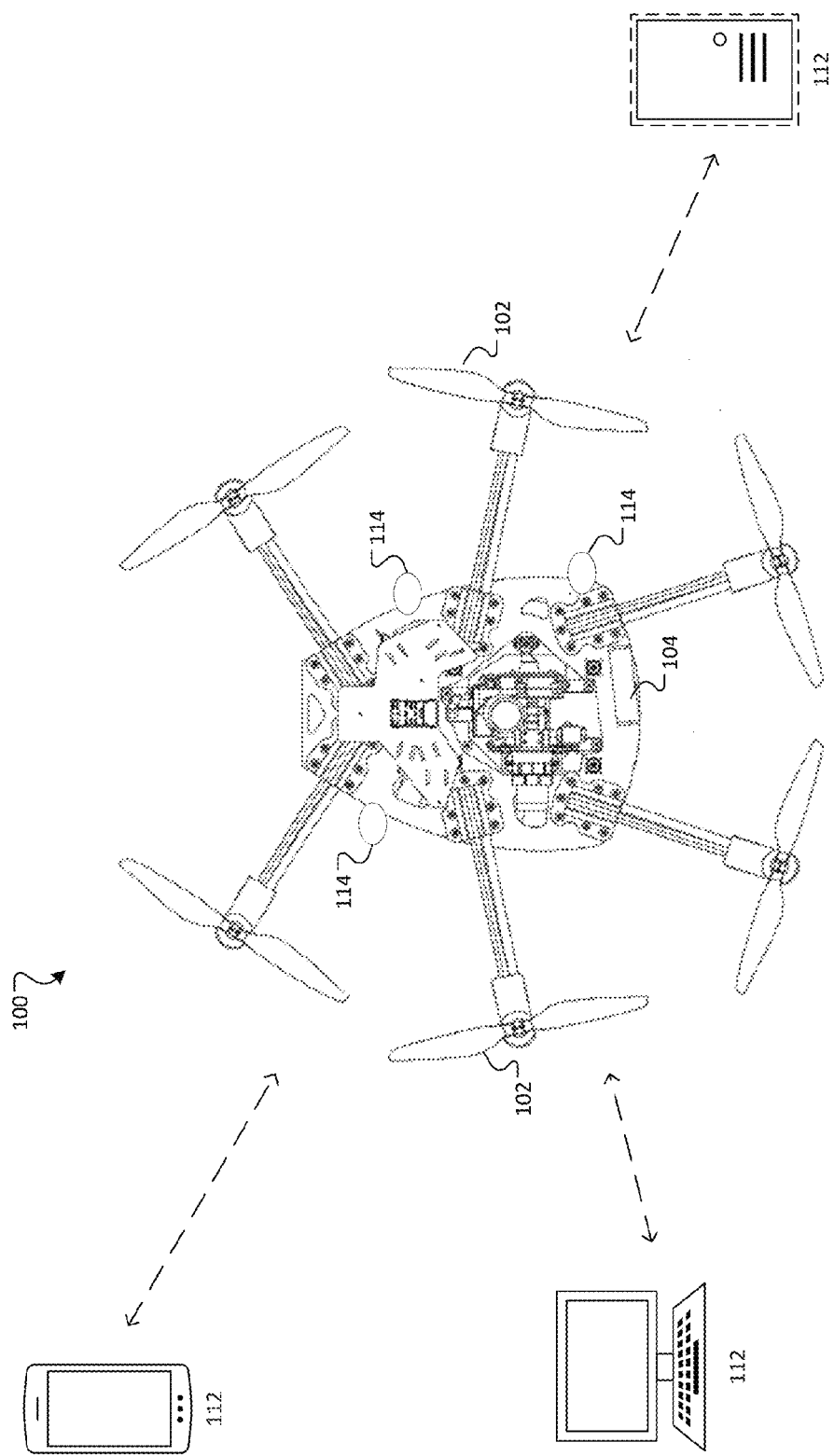
FIG. 1A is a diagram of a UAV with a data center.
Figure 1B:
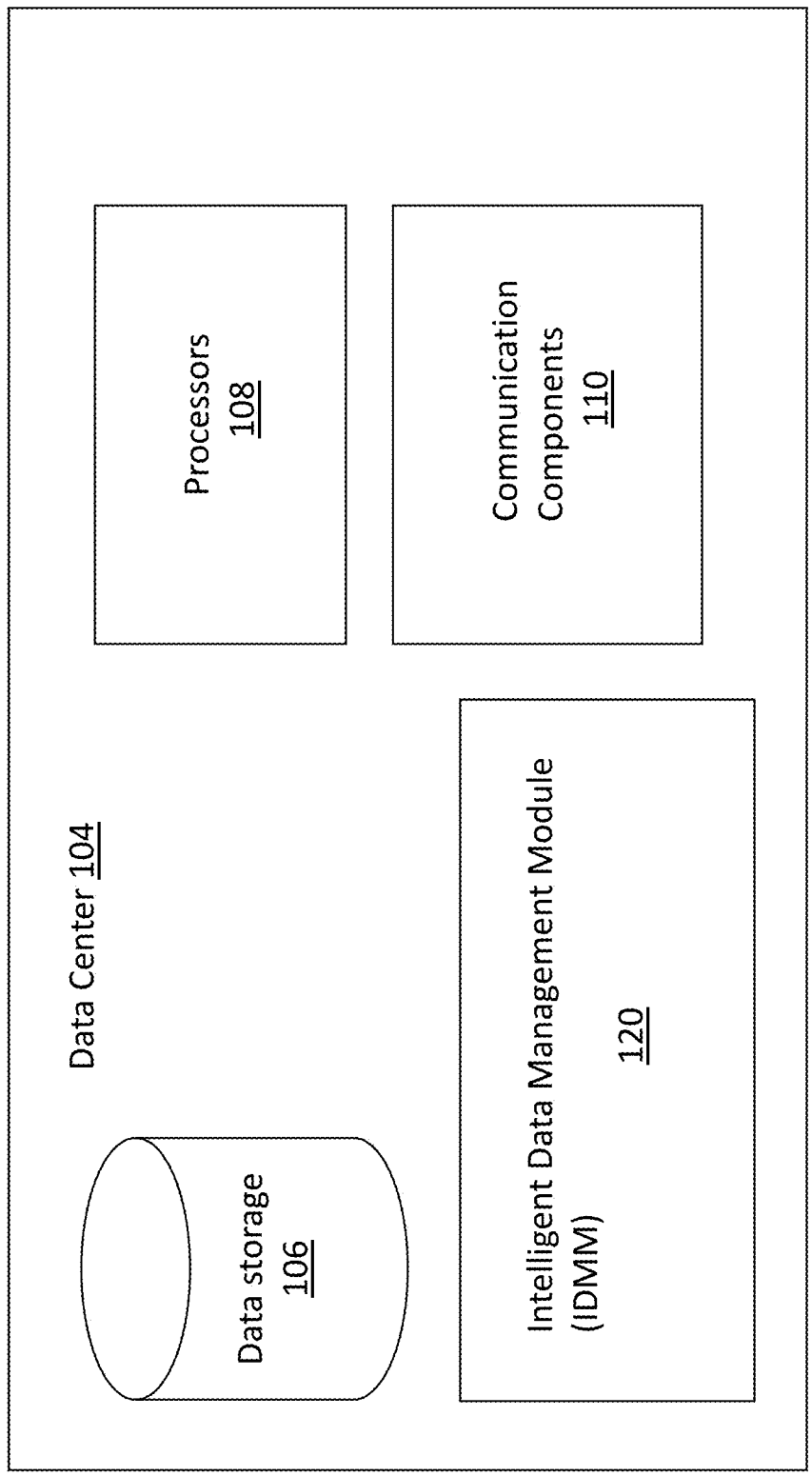
FIG. 1B is a diagram of a data center.

Referring to FIGS. 1A and 1B, a single UAV 100 can act as a mobile data center. The UAV 100 includes a hybrid generator system (described below) that acts as a power source providing power to both rotors 102 of the UAV 100 and components of a data center 104 housed on the UAV. The data center 104 can include one or more data storage components 106 for storage of data in databases, files, or other types of data storage. The data center 104 can include one or more processors 108 (e.g., microprocessors, controllers, etc.) for processing data, such as data stored in the data storage components 106, data received from another computing device, or data detected by sensors on the UAV (described below). One or more computing architectures (e.g., single processor based computing devices, multi-processing computing devices, etc.) can be employed (e.g., onboard the UAV 100) to provide the processing capabilities. The data center 104 can include wireless communication components 110, such as components for wireless internet or cellular communication, through which data can be transmitted to and/or from another computing device 112, such as another data center, a server, a personal computer, a mobile computing device (e.g., a smartphone, a tablet, a wearable computing device, etc.), or another type of computing device.

In some examples, one or more data manipulation or processing tasks can be carried out concurrently by the data center 104. For instance, data can be collected to local storage. Data can be pre-processed prior to storage to reduce local storage needs, e.g., by performing analysis on the data. Reducing local storage needs can enable the UAV 100 to operate with longer flight times without filling up the local storage space. Data can be pre-processed prior to transmitting the data to an external computing device to reduce the amount of data transmitted. In some examples, the processed data that is stored locally or transmitted to an external computing device can be data that is relevant to the operation of the UAV 100 (sometimes referred to as mission critical data) that can be used by the UAV 100 or by the external computing device to control the operation of the UAV.

The components of the data center 104 are powered by power from the hybrid generator system. The hybrid generator system includes two power systems. A first power system of the hybrid generator system uses fuel, such as gasoline or oil, to generate mechanical energy, which is in turn used to generate electrical power. A second power system of the hybrid generator system includes a rechargeable battery that provides electrical power and that can be recharged by power received from the first power system. In some examples, the components of the data center 104 are powered by power from the second power system, and the first power system can act as a backup power source in the event that a failure occurs in the second power system.

The UAV 100 can include passive or active cooling components configured to cool the hybrid generator system. In some examples, one or more of these passive or active cooling components can be positioned so as to cool the components of the data center 104. For instance, the data center 104 can be positioned in contact with a heat sink that provides passive cooling capabilities to both the hybrid generator system and the data center 104. An active cooling device, such as an air circulation system (e.g., a fan) can be positioned to circulate air around the data center 104, thus providing active cooling. In some examples, the data center 104 can be cooled by the motion of air past the data center 104 that results from the motion of the UAV 100.

In some examples, the communications components 110 of the data center 104 are configured for short- or medium-range communication, e.g., with computing devices 112 within about 50 feet, 100 feet, 500 feet, 1000 feet, or another distance of the UAV 100. The computing devices 112 can be other data centers that provide data to the data center 104 on the UAV 100 for storage and/or processing. The computing devices 112 can be personal computers or mobile computing devices in the vicinity of the data center 104 on the UAV, and the data center 104 can provide storage and/or processing capabilities for those computing devices 112.

In some examples, the UAV 100 can include one or more sensors 114 that collect data for storage and/or processing in the data center 104. The sensors 114 can include weather sensors, such as temperature or pressure sensors or other types of weather sensors, such that the UAV 100 with the data center 104 can act as a weather station (e.g., similar to a weather balloon) capable of both collecting and analyzing weather data. The sensors can include still or video cameras, e.g., for traffic analysis, surveillance, agriculture, or other applications. In some examples, images captured by the still or video cameras can be stored in the data center 104 for later analysis. In some examples, the images can be analyzed by the processors 108 in the data center. The results of the analysis can be stored in the data center and/or can be transmitted to an external computing device.

In a specific example, the data center 104 hosted on the UAV 100 can serve as a data center for computing devices 112 used by members of a military group deployed in a remote area, such as in an area with no wireless internet or cellular network access. In a specific example, the data center 104 hosted on the UAV can serve as a data center for computing devices 112 used by passengers or crew members on a ship, such as a naval ship, a fishing boat, an ocean liner, or another type of ship, in a remote part of the ocean with no wireless internet or cellular network access. By establishing a wireless communications connection between the data center 104 hosted on the UAV and the computing devices 112 used by the members of the military group or the occupants of the ship, the members of the military group or the occupants of the ship can access data storage and/or computing or processing capabilities that they would otherwise have limited access to.

In a specific example, the data center 104 hosted on the UAV 100 can act as an emergency data center that can be moved to a location responsive to an unexpected need for a data center in that location. For instance, in the event of a natural disaster, the UAV 100 can be positioned in the vicinity of recovery efforts for the natural disaster to provide data storage and/or computing or processing capabilities to rescuer and recovery workers.

Continuing to refer to FIG. 1B, the data center 104 includes an intelligent data management module (IDMM) 120 configured to, amongst other operations, provide smart power distribution to the onboard systems of the UAV 100 and the data center 104. he IDMM 120 is configured to control the delivery of power to the onboard devices of the UAV 100 (e.g., communication, flight systems, sensor systems, on-board data processing tasks) to enable the UAV 100 to complete a variety of mission tasks or objectives by controlling the distribution of power to the systems involved in completing the tasks. In one example, data center 104 processes are coordinated, throttled, and prioritized intelligently by the IDMM 120 in auspices with an onboard hybrid power management system and stored data center mission objectives. This may be done under a criterion that any flight critical power management objectives take priority over all other data center mission objectives. In operation, the IDMM 120 monitors the requests and generation of power and intelligently controls the consumption of power by the data center 104 processes to maximize the completion of mission objectives, in contrast to blindly providing power to a data center 104 module (e.g., the processor 108) whenever the module attempts to execute a task. In some instances, the IDMM 120 also controls the execution of certain data processing tasks, which may include delaying a particular task until power is available to complete the task without drawing power away from other tasks with higher priority. In this manner, the IDMM provides careful control of the UAV's 100 resources against any available headroom in power.

The IDMM 120 may utilize many different control schemes to execute its power distribution control. In generally, the IDMM acts as a mobile/portable cloud data center, solving a constrained resource optimization problem online, and onboard the UAV 100 in real-time. For instance, the IDDM can address problems such as reducing and managing energy utilization, networking loads, real-time power draw, and sometime even temperature of internal components. The IDMM 120 can also be thought of as an intelligent micro-power grid running onboard the UAV 100 and being responsive to power demand and generation changes in real-time. There are many algorithm approaches that the IDMM 120 may implement, such as branch and bound, task slicing algorithms (TSA), genetic algorithms, mixed integer programming, particle filters, simulated annealing, and even deep learning artificial neural networks. One approach to energy-aware real-time scheduling implemented by the IDMM 120 involves a technique called Dynamic Voltage and Frequency Scaling (DVFS). DVFS changes the processor 108 voltage and the clock frequency simultaneously, reducing the CPU energy consumption. Decreasing the processor 108 voltage and frequency will slow down the performance of the processor 108. If the execution performance is not a hard constraint, then, decreasing both processor 108 voltage and frequency allows for a reduction in the dynamic power consumption of the processor 108. In some implementations, the IDMM 120 optimizes from a higher-level mission management perspective, as discussed below with respect to FIGS. 24-26.

Figure 2:
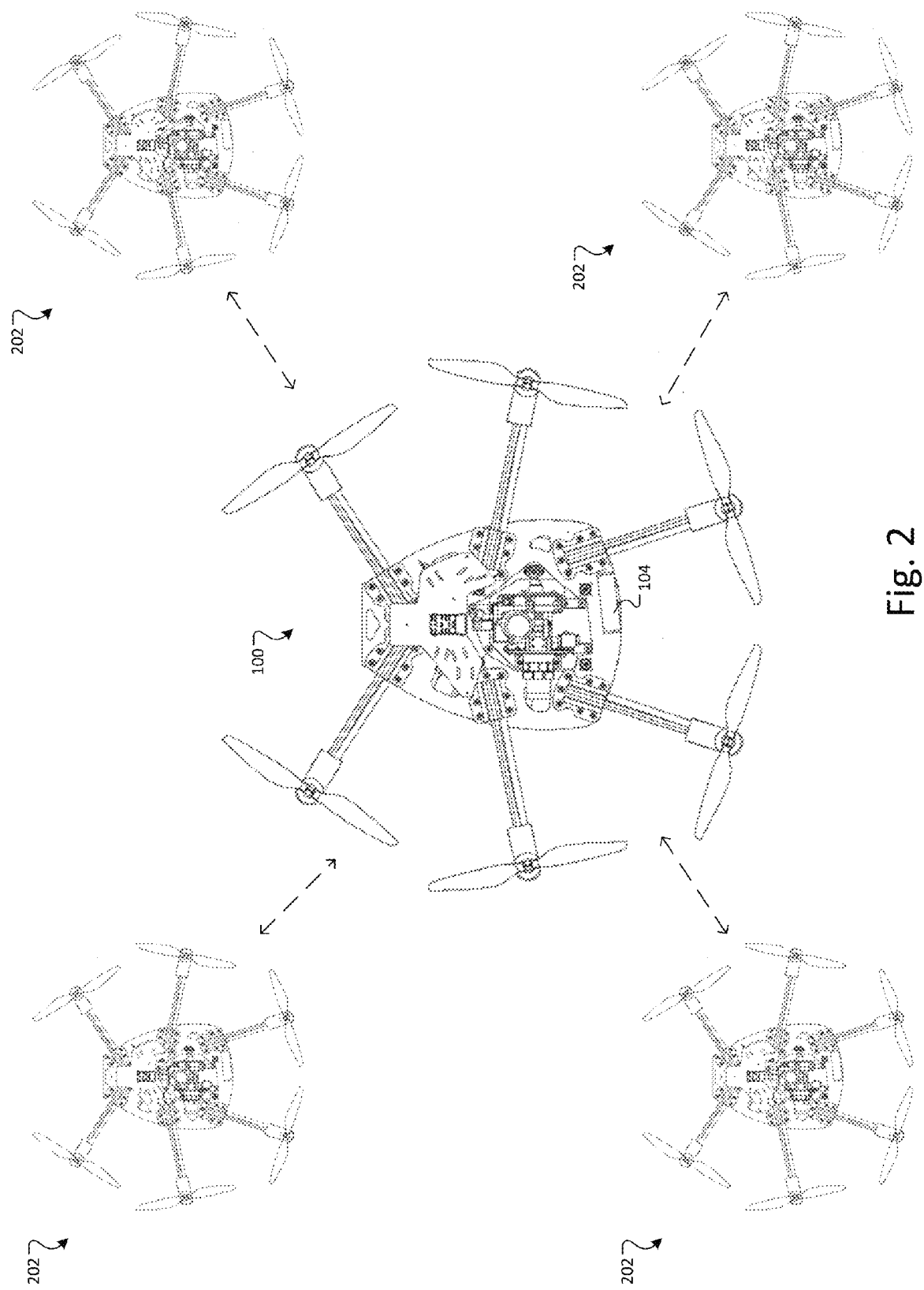
FIGS. 2 and 3 are diagrams of UAVs.

Referring to FIG. 2, in some examples, the data center 104 can serve in a logistics coordination role, e.g., to coordinate the actions of a fleet of other UAVs 202, such as UAVs performing delivery services, sensing, or other activities. The processors 108 in the data center 104 can determine, e.g., optimal routes for each UAV 202. In some examples, the processors 108 in the data center 104 can determine a route for a particular UAV 202 based at least in part on real time information about the position and/or activities of each other UAV 202. For instance, for UAVs 202 deployed for surveillance, if one or more UAVs 202 capture images indicative of a feature, event, etc. that warrants further investigation, the processors 108 in the data center can reroute one or more other of the UAVS 202 to be able to capture additional images of that feature.

Figure 3:
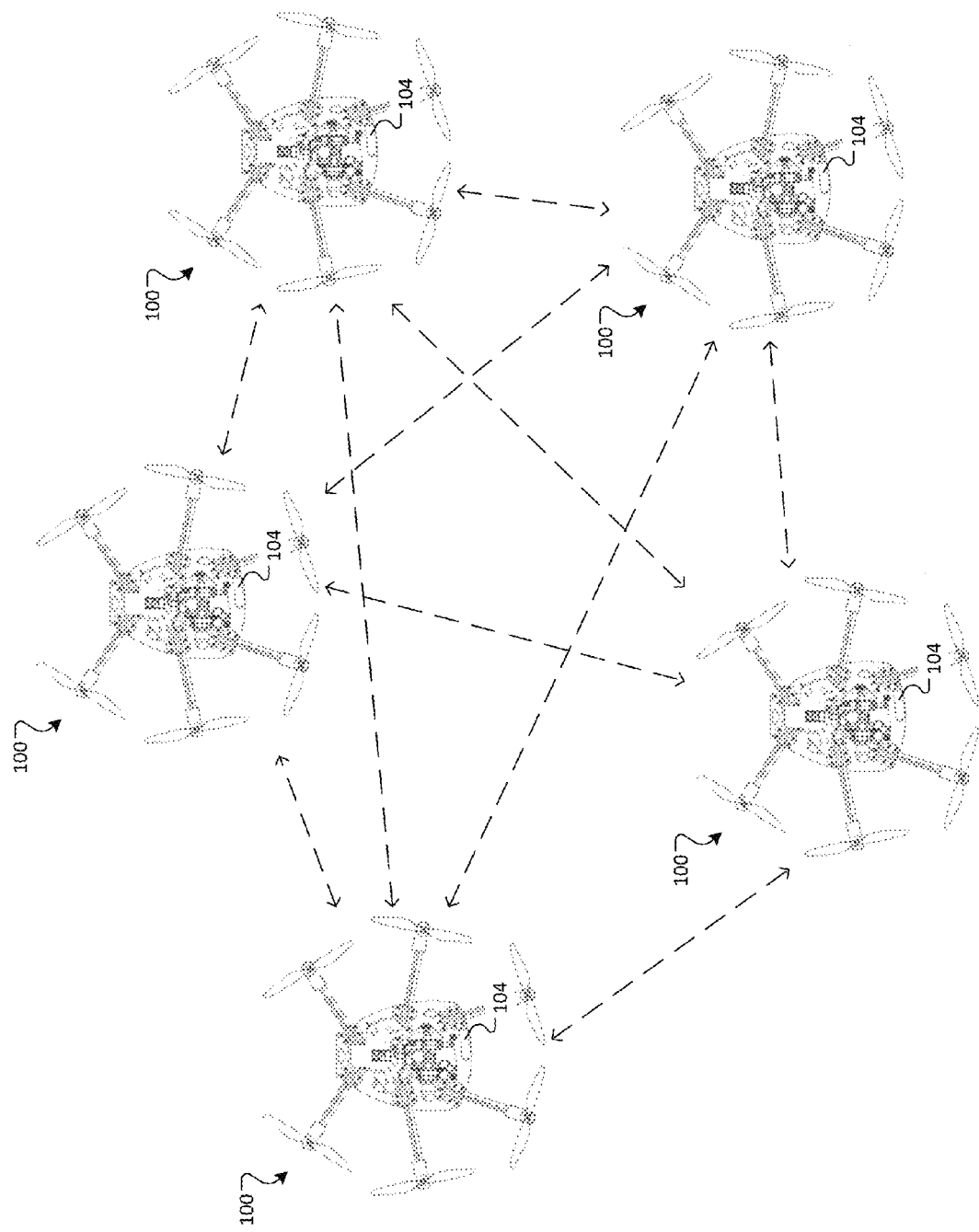

Referring to FIG. 3, in some examples, multiple UAVs 100, each having a data center 104, can form one or more network architectures for enhanced computing and/or communications capabilities. The multiple UAVs 100 can operate independently or cooperatively, e.g., the multiple UAVs 100 can act as a high performance cloud computing cluster. In a specific example, the multiple UAVs 100 can form a mesh network. In general, wireless mesh networks are multi-hop systems in which devices assist each other in transmitting packets through the network. Mesh networks can be implemented with minimal preparation, and can provide a reliable, flexible system that can be extended to many devices, such as sensors or mobile devices involved in patient monitoring or treatment. In a wireless mesh network, multiple nodes cooperate to relay a message to its destination. The mesh topology enhances the reliability of the network. For instance, a mesh network offers multiple redundant communication paths through the network. If one link in the network fails, the network automatically routes messages through an alternate path. In a mesh network, the distance between nodes can be shortened, increasing the quality of the links. A mesh network can be a self-configuring and self-healing network. For instance, a mesh network can determine how to route a message to its destination without control from a system administrator. Adding new nodes or relocating existing nodes can be performed without manual configuration. Rather, the network can discover the new or relocated node and automatically incorporate the node into the existing network.

In some examples, the data center 104 on a UAV 100 can provide communications capabilities, such as wireless Internet functionality or cellular communication services, to devices in the vicinity of the UAV 100. For instance, the data center 104 can operate as a WiFi hotspot or can act as a cell in a cellular communications network capable of data exchange, signal control, or other functionality.

Referring to FIG. 4, in some examples, a data center 402 can be incorporated onto a robot 404 or other type of device that is generally capable of performing a variety of operations. In the example of FIG. 4, both the UAV 100 and the robot 404 include data centers, such as data centers that are in communication with each other or data centers that form part of a mesh network. In some examples, the robot data center 402 can be entirely independent of the UAV data center 104.

In some examples, the UAV 100 can operate in either a wired mode or a wireless mode. The UAV 100 can operate in wired mode when the UAV is connected to an external computing device by a wired connection, e.g., when the UAV is on the ground or in the air and connected to a tether. The UAV 100 can operate in wireless mode when the UAV is connected to an external computing device by a wireless connection, e.g., when the UAV is in flight. In some examples, wired mode operation can support a higher data transmission rate than wireless mode operation. In some examples, the ability to operate in wired mode can enable the UAV to operate with a high level of security or operational robustness.

The UAV 100 and the data center 104 can be powered by a hybrid generator system that provides a small portable hybrid generator power source with energy conversion efficiency. In UAV applications, the hybrid generator system can be used to overcome the weight of the vehicle, the hybrid generator drive, and fuel used to provide extended endurance and payload capabilities in UAV applications.

The hybrid generator system can include two separate power systems. A first power system included as part of the hybrid generator system can be a small and efficient gasoline powered engine coupled to a generator motor. The first power system can serve as a primary source of power of the hybrid generator system. A second power system, included as part of the hybrid generator system, can be a high energy density rechargeable battery. Together, the first power system and the second power system combine to form a high energy continuous power source and with high peak power availability for a UAV and for the data center housed on the UAV. In some examples, one of the first power system and the second power system can serve as a back-up power source of the hybrid generator system if the other power system experiences a failure.

Figure 5:
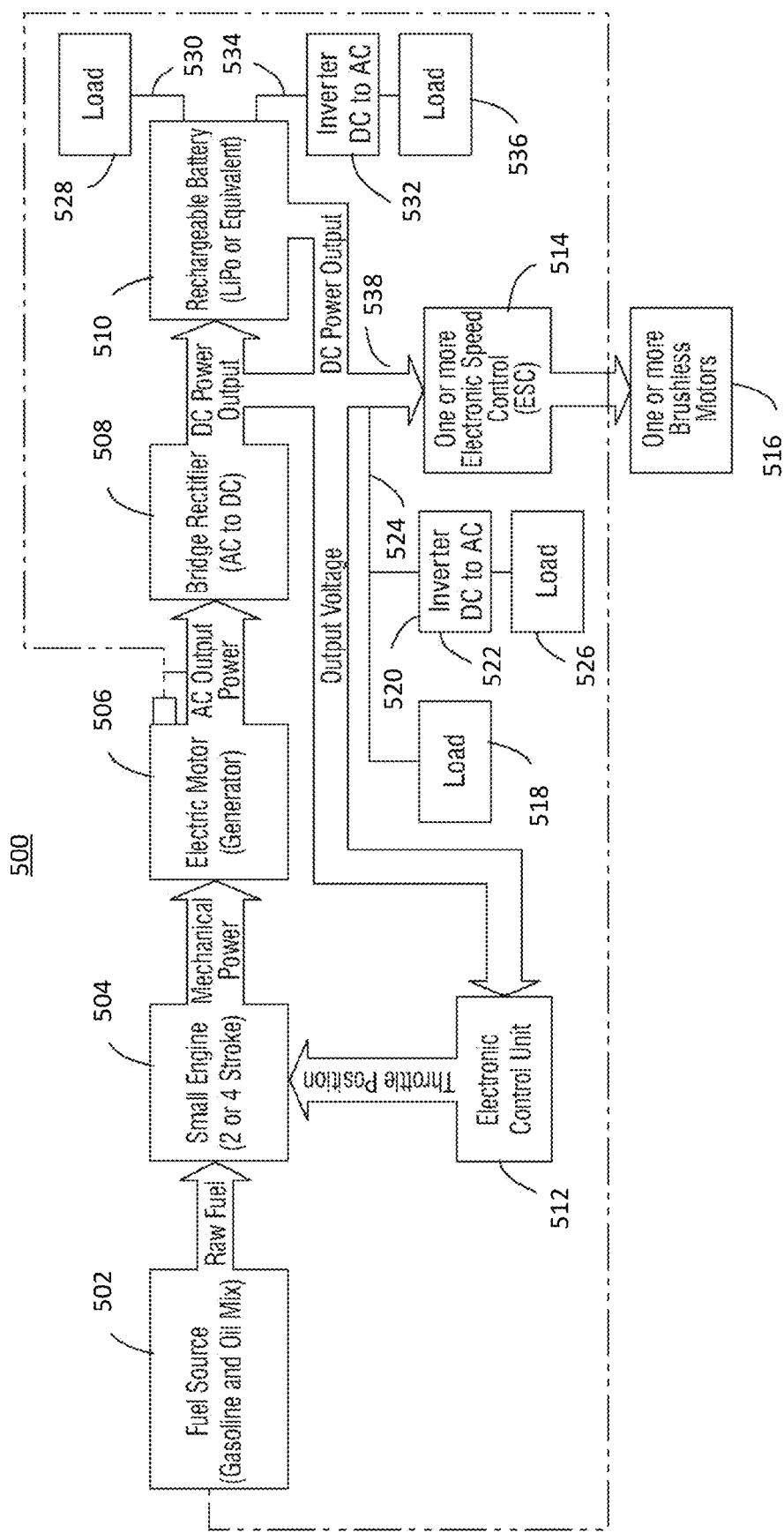
FIG. 5 depicts a diagram of an example hybrid generator system.

FIG. 5 depicts a diagram of an example hybrid generator system 500. The hybrid generator system 500 includes a fuel source 502, e.g., a vessel for storing gasoline, a mixture of gasoline and oil mixture, or similar type fuel or mixture. The fuel source 502 provides fuel to an engine 504, of a first power system. The engine 504 can use the fuel provided by the fuel source 502 to generate mechanical energy. In one example, the engine 504 can have dimensions of about 12" by 11" by 6" and a weight of about 3.5 lbs to allow for integration in a UAV. In one example, the engine 504 may be an HWC/Zenoah G29 RCE 3D Extreme available from Zenoah, 1-9 Minamidai Kawagoe, Saitama 350-2025, Japan. The hybrid generator system 500 also includes a generator motor 506 coupled to the engine 504. The generator motor 506 functions to generate AC output power using mechanical power generated by the engine 504. In some examples, a shaft of the engine 504 includes a fan that dissipates heat away from the engine 504. In some examples, the generator motor 506 is coupled to the engine 504 through a polyurethane coupling.

In some examples, the hybrid generator system 500 can provide 1.8 kW of power. The hybrid generator system 500 can include an engine 504 that provides approximately 3 horsepower and weighs approximately 1.5 kg, e.g., a Zenoah® G29RC Extreme engine. The hybrid generator system 500 can include a generator motor 506 that is a brushless motor, 380 Kv, 8 mm shaft, part number 5035-380, available from Scorpion Precision Industry®.

In some examples, the hybrid generator system 500 can provide 10 kW of power. The hybrid generator system 500 can include an engine 504 that provides approximately between 15-16.5 horsepower and weighs approximately 7 pounds, e.g. a Desert Aircraft® D-150. The hybrid generator system 500 can include a generator motor 506 that is a Joby Motors® JM1 motor.

The hybrid generator system 500 includes a bridge rectifier 508 and a rechargeable battery 510. The bridge rectifier 508 is coupled between the generator motor 506 and the rechargeable battery 510 and converts the AC output of the generator motor 506 to DC power to charge the rechargeable battery 510 or provide DC power to load 518 by line 520 or power to DC-to-AC inverter 522 by line 524 to provide AC power to load 526. The rechargeable battery 510 may provide DC power to load 528 by line 530 or to DC-to-AC inverter 532 by line 534 to provide AC power to load 536. In one example, an output of the bridge rectifier 508 and/or the rechargeable battery 510 of hybrid generator system 500 is provided by line 538 to one or more electronic speed control devices (ESC) 514 integrated in one or more rotor motors 516 as part of an UAV. The ESC 514 can control the DC power provided by bridge rectifier 508 and/or rechargeable battery 510 to one or more rotor motors provided by generator motor 506. In one example, the ESC 514 can be a T-Motor® ESC 45A (2-6S) with SimonK. In one example, the bridge rectifier 508 can be a model #MSD100-08, diode bridge 800V 100A SM3, available from Microsemi Power Products Group®. In some examples, active rectification can be applied to improve efficiency of the hybrid generator system.

In some examples, the ESC 514 can control an amount of power provided to one or more rotor motors 516 in response to input received from an operator. For example, if an operator provides input to move a UAV to the right, then the ESC 514 can provide less power to rotor motors 516 on the right of the UAV to cause the rotor motors to spin propellers on the right side of the UAV slower than propellers on the left side of the UAV. As power is provided at varying levels to one or more rotor motors 516, a load, e.g. an amount of power provided to the one or more rotor motors 516, can change in response to input received from an operator.

In some examples, the rechargeable battery 510 may be a LiPo battery, providing 3000 mAh, 22.2V 65 C, Model PLU65-30006, available from Pulse Ultra Lipo®, China. In other designs, the rechargeable battery 510 may be a lithium sulfur (LiSu) rechargeable battery or similar type of rechargeable battery.

The hybrid generator system 500 includes an electronic control unit (ECU) 512. The ECU 512, and other applicable systems described in this paper, can be implemented as a computer system, a plurality of computer systems, or parts of a computer system or a plurality of computer systems. In general, a computer system includes a processor, memory, non-volatile storage, and an interface. A typical computer system usually includes at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, Ethernet interface, satellite transmission interface (e.g. "direct PC"), or other interfaces for coupling a computer system to other computer systems. Interfaces enable computer systems and other devices to be coupled together in a network.

A computer system can be implemented as a module, as part of a module, or through multiple modules. As used in this paper, a module includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the module's functionality, or the like. As such, a first module and a second module can have one or more dedicated processors, or a first module and a second module can share one or more processors with one another or other module s. Depending upon implementation-specific or other considerations, a module can be centralized or its functionality distributed. A module can include hardware, firmware, or software embodied in a computer-readable medium for execution by the processor. The processor transforms data into new data using implemented data structures and methods, such as is described with reference to the FIGS. in this paper.

The ECU 512 is coupled to the bridge rectifier 508 and the rechargeable battery 510. The ECU 512 can be configured to measure the AC voltage of the output of the generator motor 506, which is directly proportional to the revolutions per minute (RPM) of the engine 504, and compares it to the DC power output of the bridge rectifier 508. The ECU 512 can control the throttle of the engine 504 to cause the DC power output of the bridge rectifier 508 to increase or decrease as the load changes, e.g., a load of one or more electric motors 516 or one or more of loads 518, 526, 528, and 536. In one example, the ECU 512 can be an Arduino® MEGA 2560 Board R3, available from China. In various embodiments, a load of one or more electric motors 516 can change as the ESC 514 changes an amount of power provided to the electric motors 516. For example, if a user inputs to increase the power provided to the electric motors 516 subsequently causing the ESC 514 to provide more power to the electric motors 516, then the ECU 512 can increase the throttle of the engine 504 to cause the production of more power to provide to the electronic motors 516.

The ECU 512 can function to maintain voltage output of loads by reading the sensed analog voltage, converting these to ADC counts, comparing the count to that corresponding to a desired voltage, and increasing or decreasing the throttle of the engine 504 according to the programmed gain if the result is outside of the dead band.

In one example, the hybrid generator system 500 can provide about 1,800 watts of continuous power, 10,000 watts of instantaneous power (e.g., 6S with 16,000 mAh pulse battery) and has a 1,500 Wh/kg gasoline conversion rate. In one example, the hybrid generator system 500 has dimensions of about 12" by 12" by 12" and a weight of about 8 lbs.

Figure 6:
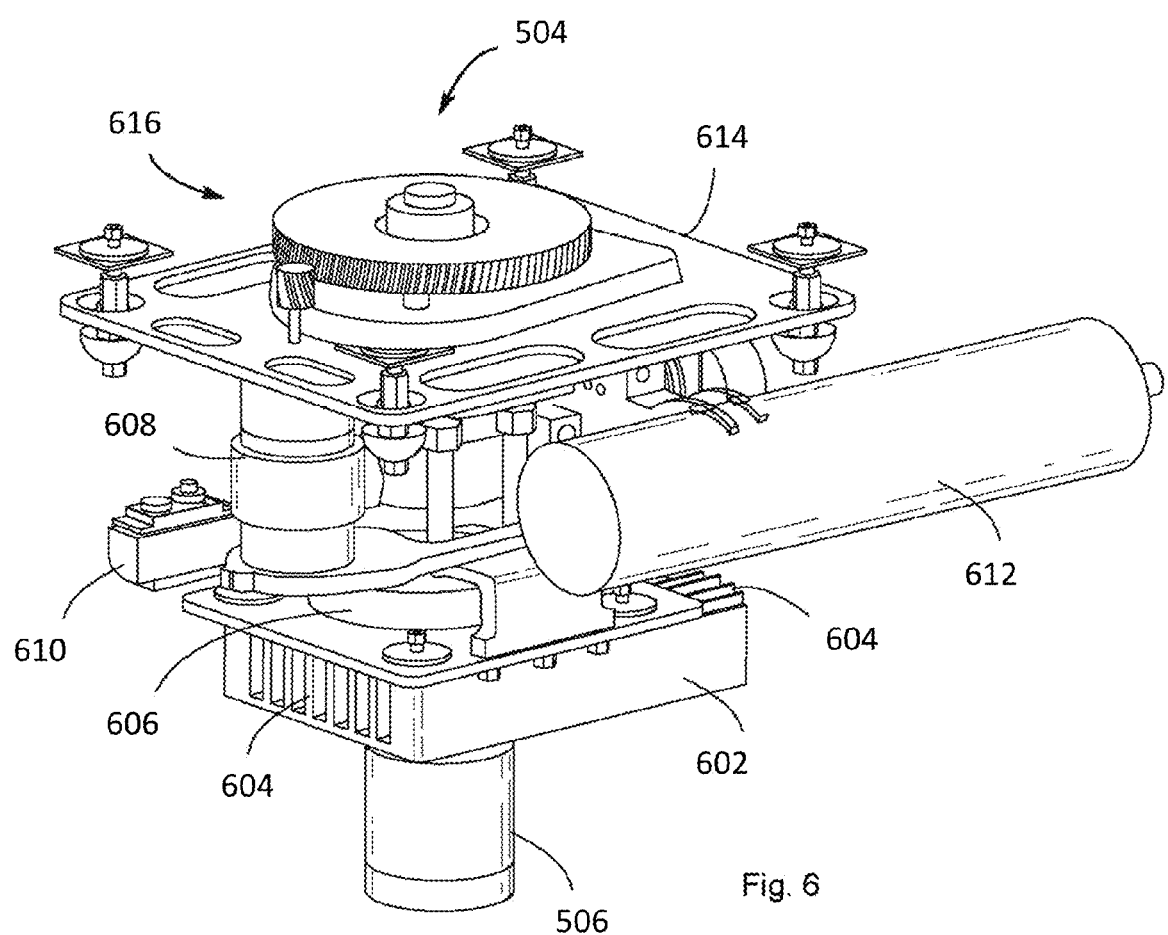
FIG. 6 depicts a side perspective view of a hybrid generator system.
Figure 22A:
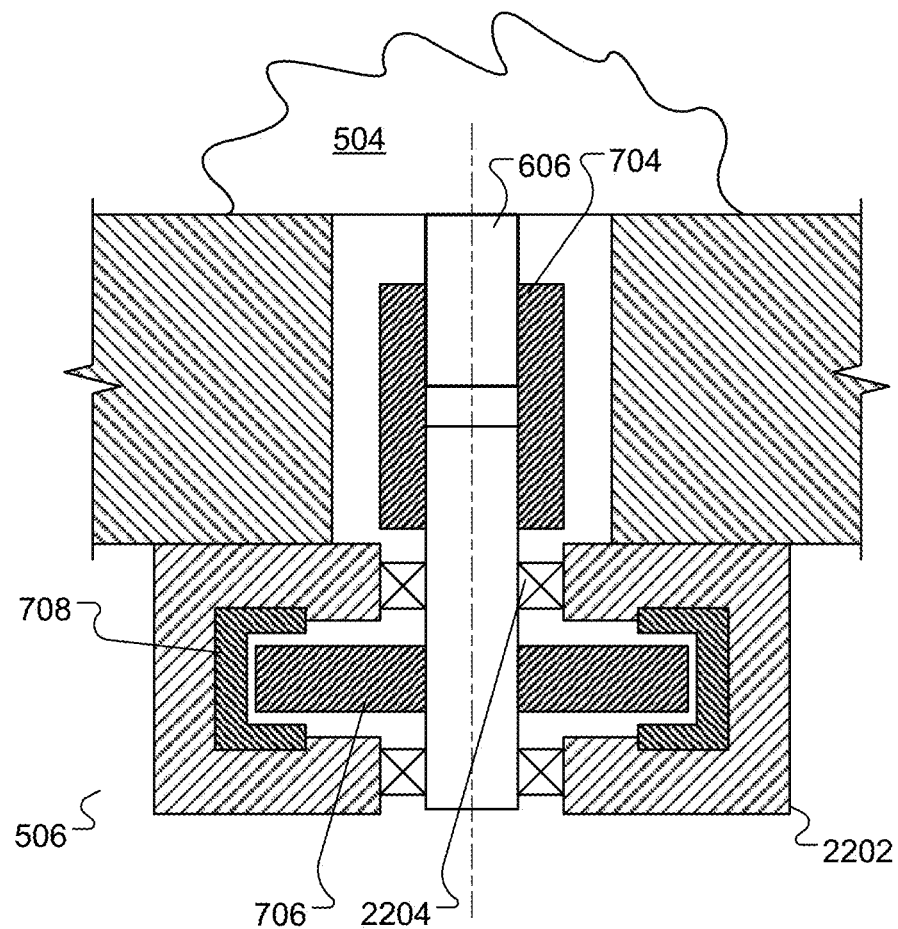
FIGS. 22A and 22B are diagrams of portions of a hybrid generator system.

FIG. 6 depicts a side perspective view of a hybrid generator system 500. FIG. 7A depicts a side view of a hybrid generator 500. FIG. 7B depicts an exploded side view of a hybrid generator 500. The hybrid generator system 500 includes an engine 504 coupled to generator motor 506. In one embodiment, the engine 504 includes a coupling/cooling device 602 which provides coupling of the shaft of the generator motor 506 to the shaft of engine 504 and also provides cooling with sink fins 604. For example, FIGS. 7A and 7B, show in further detail one embodiment of coupling/cooling device 602, which includes coupling/fan 702 with set screws 704 that couple shaft 706 of generator motor 506 and shaft 708 of engine 504. Coupling/cooling device 602 may also include rubber coupling ring 2202 (FIG. 22A).

In various embodiments, the hybrid generator system 500 includes components to facilitate transfer of heat away from the hybrid generator system 500 and/or is integrated within a UAV to increase airflow over components that produce heat. For example, the hybrid generator system 500 can include cooling fins on specific components, e.g. the rectifier, to transfer heat away from the hybrid generator system. In various implementations, the hybrid generator system 500 includes components and is integrated within a UAV to cause heat to be transferred towards the exterior of the UAV.

In various embodiments, the hybrid generator system 500 and/or a UAV integrating the hybrid generator system 500 is configured to allow 406 cubic feet per minute of airflow across at least one component of the hybrid generator system 500. An engine 504 of the hybrid generator system 500 can be run at an operating temperature 150° C. and if an ambient temperature in which the hybrid generator system 10, in order to remove heat generated by the engine 506, an airflow of 406 cubic feet per minute is achieved across at least the engine 506. Further in various embodiments, the engine 506 is operated at 16.5 Horsepower and generates 49.2 kW of waste heat, e.g. each head of the engine produces 24.6 kW of waste heat. In various embodiments, engine heads of the engine 506 of the hybrid generator system 500 are coupled to electric ducted fans to concentrate airflow over the engine heads. For example, 406 cubic feet per minute airflow can be achieved over engine heads of the engine 506 using electric ducted fans.

In various embodiments, the hybrid generator system 500 is integrated as part of a UAV using a dual vibration damping system. An engine 506 of the hybrid generator system can utilize couplings to serve as dual vibration damping systems. In one example, the engine 506 produces a mean torque of 1.68 Nm at 10,000 RPM. In the various embodiments, a urethane coupling is used to couple, at least part of, the hybrid generator system 500 to a UAV. Further in the one example, the urethane coupling can have a durometer value of between 90 A to 75 D. Example urethane couplings used to secure, at least part of, the hybrid generator system 500 to a UAV include L42 Urethane, L100 Urethane, L167 Urethane, and L315 Urethane. Urethane couplings used to secure, at least part of, the hybrid generator system 500 to a UAV can have a tensile strength between 20 MPa and 62.0 MPa, between 270 to 800% elongation at breaking, a modulus between 2.8 MPa and 32 MPa, an abrasion index between 110% and 435%, and a tear strength split between 12.2 kN/m and 192.2 kN/m.

Engine 504, FIGS. 6 and 7, also includes fly wheel 606 which reduces mechanical noise and/or engine vibration. Preferably, engine 504 includes Hall Effect sensor 710, FIG. 7A, and Hall Effect magnet coupled to fly wheel 606 as shown. In one example, Hall-effect sensor 710 may be available from RCexl Min Tachometer®, Zhejiang Province, China.

When engine 504 is operational, fly wheel 606 spins and generates a voltage which is directly proportional to the revolutions per minute of fly wheel 606. This voltage is measured by Hall-effect sensor 710 and is input into an ECU 512. The ECU 512 compares the measured voltage to the voltage output by generator motor 506. ECU 512 will then control the throttle of either or both the generator motor 506 and the engine 504 to increase or decrease the voltage as needed to supply power to one or more of loads 518, 526, 528, and/or 536 or one or more rotor motors 516.

Engine 504 may also include a starter motor 608, servo 610, muffler 612, and vibrational mount 614.

Figure 8:
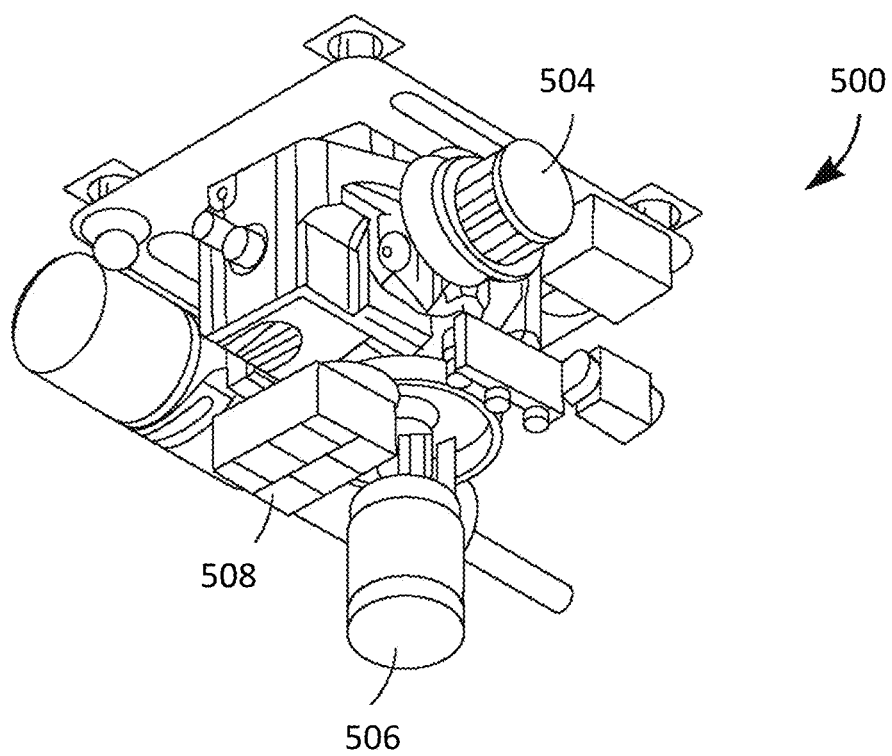
FIG. 8 is a perspective view of a hybrid generator system.

FIG. 8 is a perspective view of a hybrid generator system 500. The hybrid generator system 500 includes a motor 504 and generator motor 506 coupled to a bridge rectifier 508.

Figure 9:
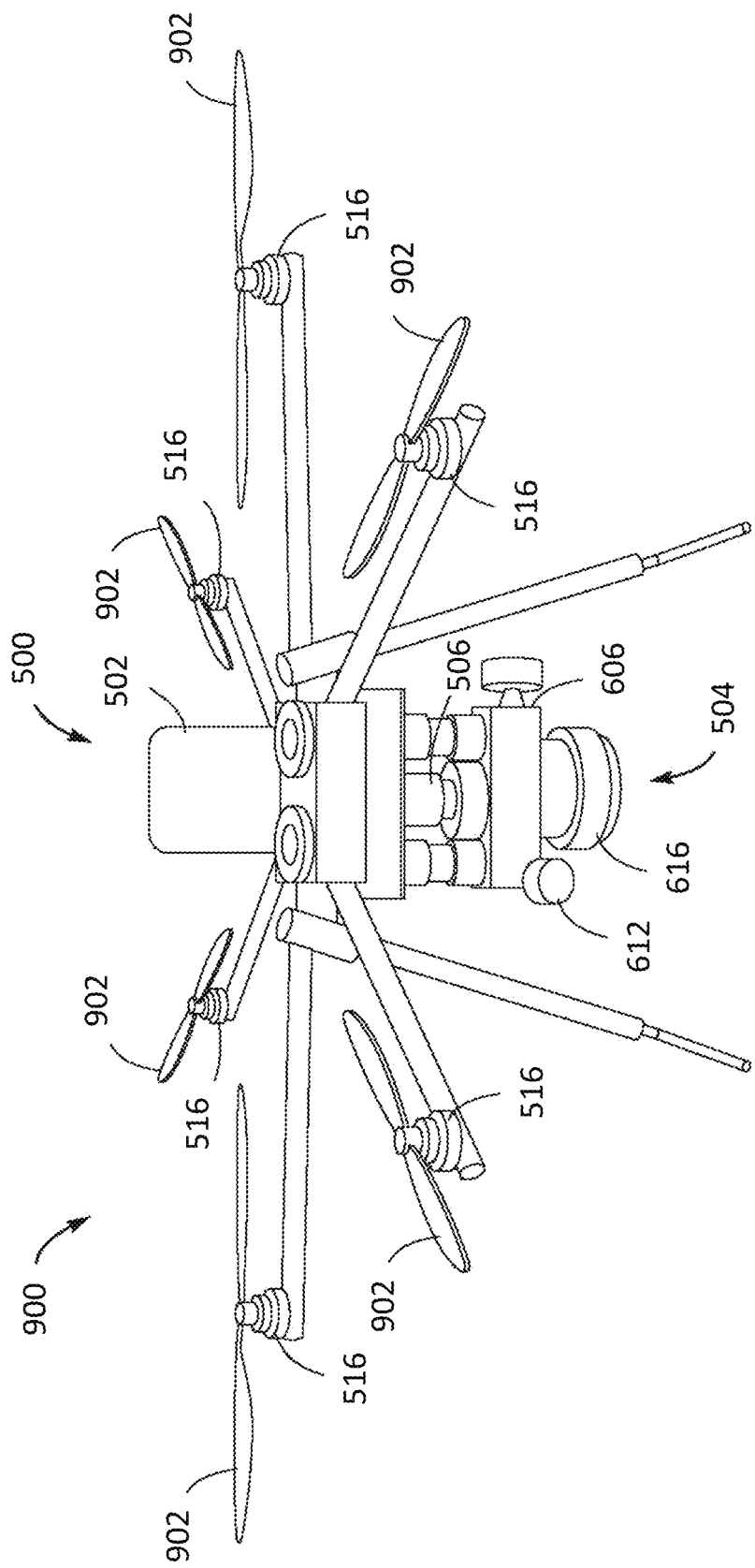
FIG. 9 is a perspective view of a UAV integrated with a hybrid generator system.

FIG. 9 is a perspective view of a UAV 900 integrated with a hybrid generator system 500. The UAV 900 includes six rotor motors 516 each coupled to propellers 902, however it is appreciated that a UAV integrated with a hybrid generator system 500 can include more or less rotor motors and propeller. The UAV 900 can include a Px4 flight controller manufactured by Pixhawk®.

In one embodiment, engine 504, as shown in FIGS. 4-9 may be started using an electric starter 616. Fuel source 502, as shown in FIG. 5 (also shown in FIG. 9) delivers fuel to engine 504 to spin its rotor shaft directly coupled to generator motor 506 as shown in FIG. 7 and applies a force to generator motor 506. The spinning of generator motor 506 generates electricity and the power generated by motor generator 506 is proportional to the power applied by shaft of engine 504. Preferably, a target rotational speed of generator motor 506 is determined based on the KV (rpm/V) of generator motor 506. For example, if a target voltage of 25 Volt DC is desired, the rating of generator motor 506 would be about 400 KV. The rotational speed of the engine 504 may be determined by the following equations:

$$RPM = KV(RPM/Volt) \times Target\ Voltage(VDC) \quad (1)$$

$$RPM = 400\ KV \times 25\ VDC \quad (2)$$

$$RPM = 10,000 \quad (3)$$

In this example, for generator motor 506 to generate 25 VDC output, the shaft of generator motor 506 coupled to the shaft of engine 504 needs to spin at about 10,000 RPM.

As the load, e.g., one or more motors 516 or one or more of loads 518, 526, 528, and/or 536, is applied to the output of generator motor 506, the voltage output of the hybrid generator system 500 will drop which will cause the speed of engine 504 and generator motor 506 to be reduced. In this case, ECU 512 can be used to help regulate the throttle of engine 504 to maintain a consistent output voltage that varies with loads. ECU 512 can act like a standard governor for gasoline engines but instead of regulating an RPM, it can regulate a target voltage output of either or both a bridge rectifier and a generator motor 506 based on a closed loop feedback controller.

Power output from generator motor 506 can be in the form of alternating current (AC) which needs to be rectified by bridge rectifier 508. Bridge rectifier 508 can convert the AC power into direct current (DC) power, as discussed above. In various embodiments, the output power of the hybrid generator system 500 can be placed in a "serial hybrid" configuration, where the generator power output by generator motor 506 may be available to charge the rechargeable battery 510 or provide power to another external load.

In operation, there can be at least two available power sources when the hybrid generator system 500 is functioning. A primary source can be from the generator motor 506 through directly from the bridge rectifier and a secondary power source can be from the rechargeable battery 510. Therefore, a combination of continuous power availability and high peak power availability is provided, which may be especially well-suited for UAV applications or a portable generator applications. In cases where either primary (generator motor 506) power source is not available, system 500 can still continue to operate for a short period of time using power from rechargeable battery 510 allowing a UAV to sustain safety strategy, such as an emergency landing.

When hybrid generator system 500 is used for UAVs, the following conditions can be met to operate the UAV effectively and efficiently: 1) the total continuous power (watts) can be greater than power required to sustain UAV flight, 2) the power required to sustain a UAV flight is a function of the total weight of the vehicle, the total weight of the hybrid engine, the total weight of fuel, and the total weight of the payload), where:

$$Total\ Weight(gram) = vehicle\ dry\ weight + engine\ 504\ weight + fuel\ weight + payload \quad (4)$$

and, 3) based on the vehicle configuration and aerodynamics, a particular vehicle will have an efficiency rating (grams/watt) of 11, where:

$$Total\ Power\ Required\ to\ Fly = \eta \times Weight(gram) \quad (5)$$

In cases where the power required to sustain flight is greater than the available continuous power, the available power or total energy is preferably based on the size and configuration of the rechargeable battery 510. A configuration of the rechargeable battery 510 can be based on a cell configuration of the rechargeable battery 510, a cell rating of the rechargeable battery 510, and/or total mAh of the rechargeable battery 510. In one example, for a 6S, 16000 mAh, 25 C battery pack, the total energy is determined by the following equations:

$$Total\ Energy = Voltage \times mAh = 25\ VDC(6S) \times 16000\ mAh = 400\ Watt*Hours \quad (6)$$

$$Peak\ Power\ Availability = Voltage \times mAh \times C\ Rating = 25\ VDC \times 16000\ mAh \times 25\ C\ 10,400\ Watts \quad (7)$$

Total Peak Time=400Watt*Hours/10,400Watts=138.4 secs  (8)

Further in the one example, the rechargeable battery 510 will be able to provide 10,400 Watts of power for 138.4 seconds in the event of primary power failure from engine 504. Additionally, the rechargeable battery 510 may be able to provide up to 10,400 Watts of available power for flight or payload needs instantaneous peak power for short periods of time needed for aggressive maneuvers.

The result is hybrid generator system 500 when coupled to a UAV efficiently and effectively provides power to fly and maneuver the UAV for extended periods of time with higher payloads than conventional multi-rotor UAVs. In one example, the hybrid generator system 500 can provide a loaded (3 lb. load) flight time of up to about 2 hours 5 mins, and an unloaded flight time of about 2 hours and 35 mins Moreover, in the event that the fuel source runs out or the engine 504 and/or he generator motor 506 malfunctions, the hybrid generator system 500 can use the rechargeable battery 510 to provide enough power to allow the UAV to perform a safe landing. In various embodiments, the rechargeable battery 510 can provide instantaneous peak power to a UAV for aggressive maneuvers, for avoiding objects, or threats, and the like.

In various embodiments, the hybrid generator system 500 can provide a reliable, efficient, lightweight, portable generator system which can be used in both commercial and residential applications to provide power at remote locations away from a power grid and for a micro-grid generator, or an ultra-micro-grid generator.

In various embodiments, the hybrid generator system 500 can be used for an applicable application, e.g. robotics, portable generators, micro-grids and ultra-micro-grids, and the like, where an efficient high energy density power source is required and where a fuel source is readily available to convert hydrocarbon fuels into useable electric power. The hybrid generator system 500 has been shown to be significantly more energy efficient than various forms of rechargeable batteries (Lithium Ion, Lithium Polymer, Lithium Sulfur) and even Fuel Cell technologies typically used in conventional UAVs.

Figure 10:
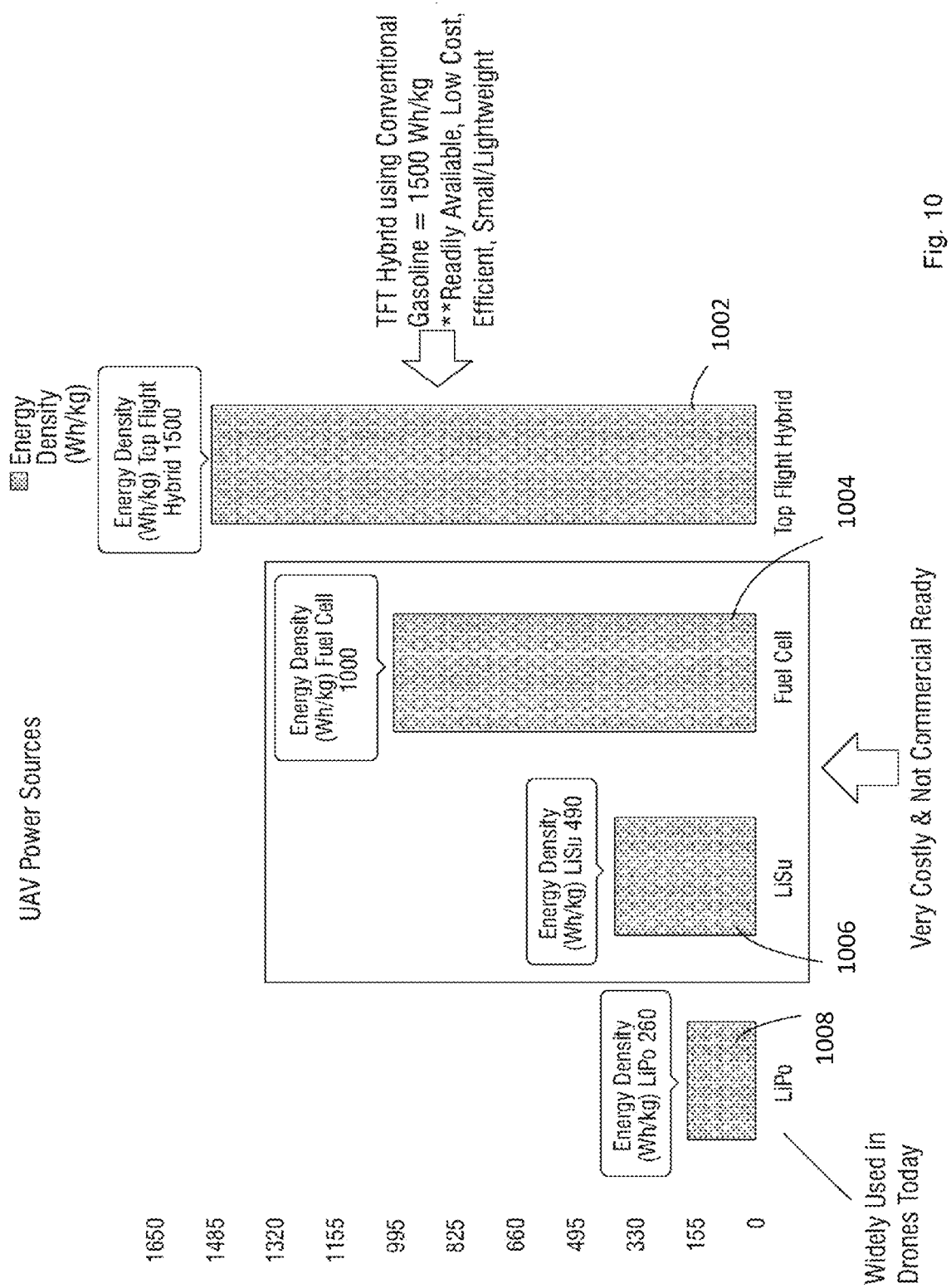
FIG. 10 depicts a graph comparing energy density of different UAV power sources.

FIG. 10 depicts a graph comparing energy density of different UAV power sources. In various embodiments, the hybrid generator system 500 can use conventional gasoline which is readily available at low cost and provide about 1,500 Wh/kg of power for UAV applications, e.g., as indicated at 1002 in FIG. 6. Conventional UAVs which rely entirely on batteries can provide a maximum energy density of about 1,000 Wh/kg when using an energy high density fuel cell technology, indicated at 1004 about 400 Wh/kg when using lithium sulfur batteries, indicated at 1006, and only about 200 Wh/kg when using a LiPo battery, indicated at 1008.

Figure 11:
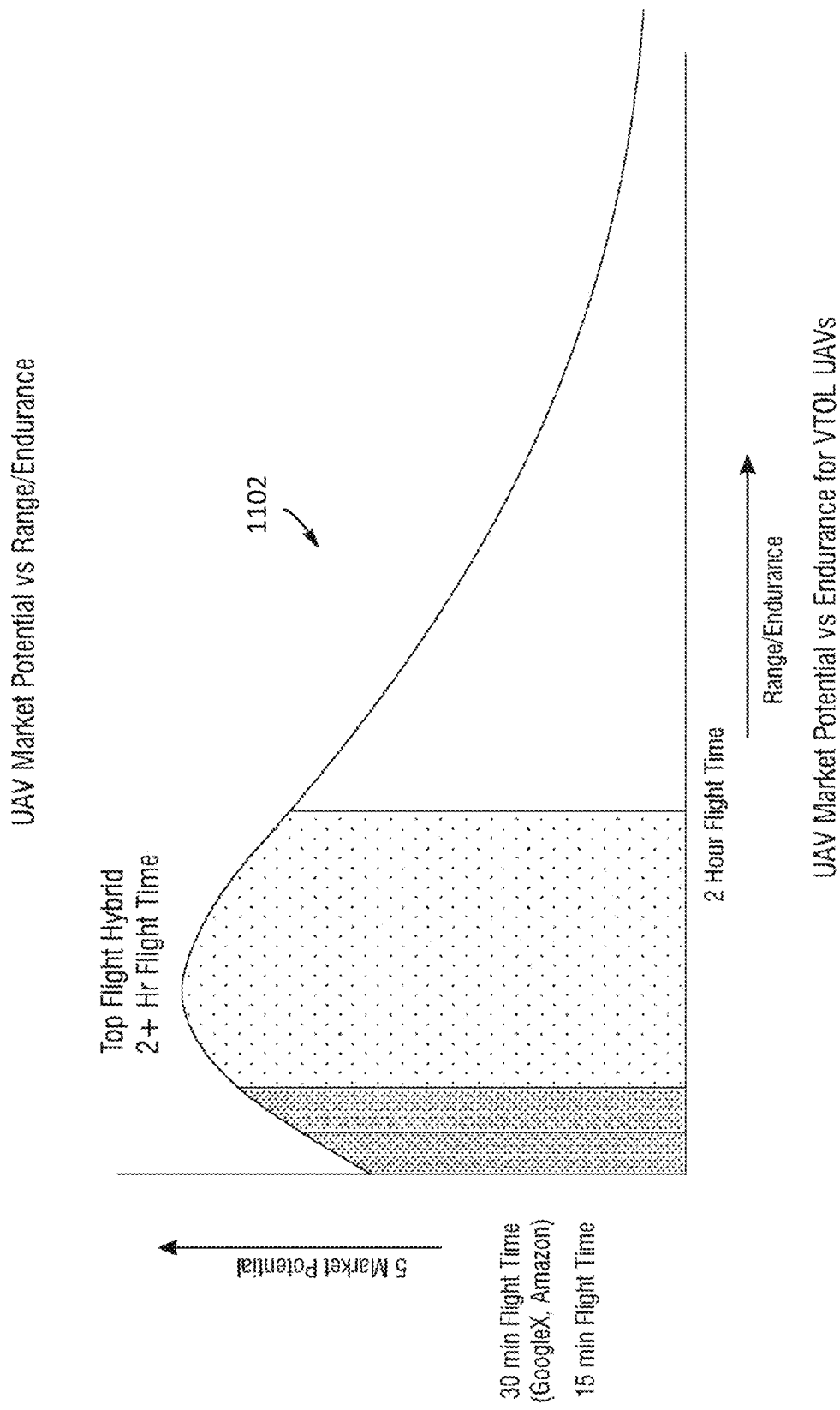
FIG. 11 depicts a graph of market potential for UAVs against flight time for an example two plus hours of flight time hybrid generator system of one or more embodiments when coupled to a UAV is able to achieve and an example of the total market potential vs. endurance for the hybrid generator system for UAVs.

FIG. 11 depicts a graph 1104 of market potential for UAVs against flight time for an example two plus hours of flight time hybrid generator system 500 of one or more when coupled to a UAV is able to achieve and an example of the total market potential vs. endurance for the hybrid generator system 500 for UAVs.

In various embodiments, the hybrid generator power systems 500 can be integrated as part of a UAV or similar type aerial robotic vehicle to perform as a portable flying generator using the primary source of power to sustain flight of the UAV and then act as a primary power source of power when the UAV has reached its destination and is not in flight. For example, when a UAV which incorporates hybrid system 10, e.g., UAV 900, FIG. 9, is not in flight, the available power generated by hybrid system can be transferred to one or more of external loads 518, 526, 528, and/or 536 such that hybrid generator system 500 operates as a portable generator. Hybrid system generator 500 can provide continuous peak power generation capability to provide power at remote and often difficult to reach locations. In the "non-flight portable generator mode", hybrid system 500 can divert the available power generation capability towards external one or more of loads 518, 526, 528, and/or 536. Depending on the power requirements, one or more of DC-to-AC inverters 522, 532 may be used to convert DC voltage to standard AC power (120 VAC or 240 VAC).

In operation, hybrid generator system 500 coupled to a UAV, such as UAV 900, FIG. 9, will be able to traverse from location to location using aerial flight, land, and switch on the power generator to convert fuel into power.

Figure 12:
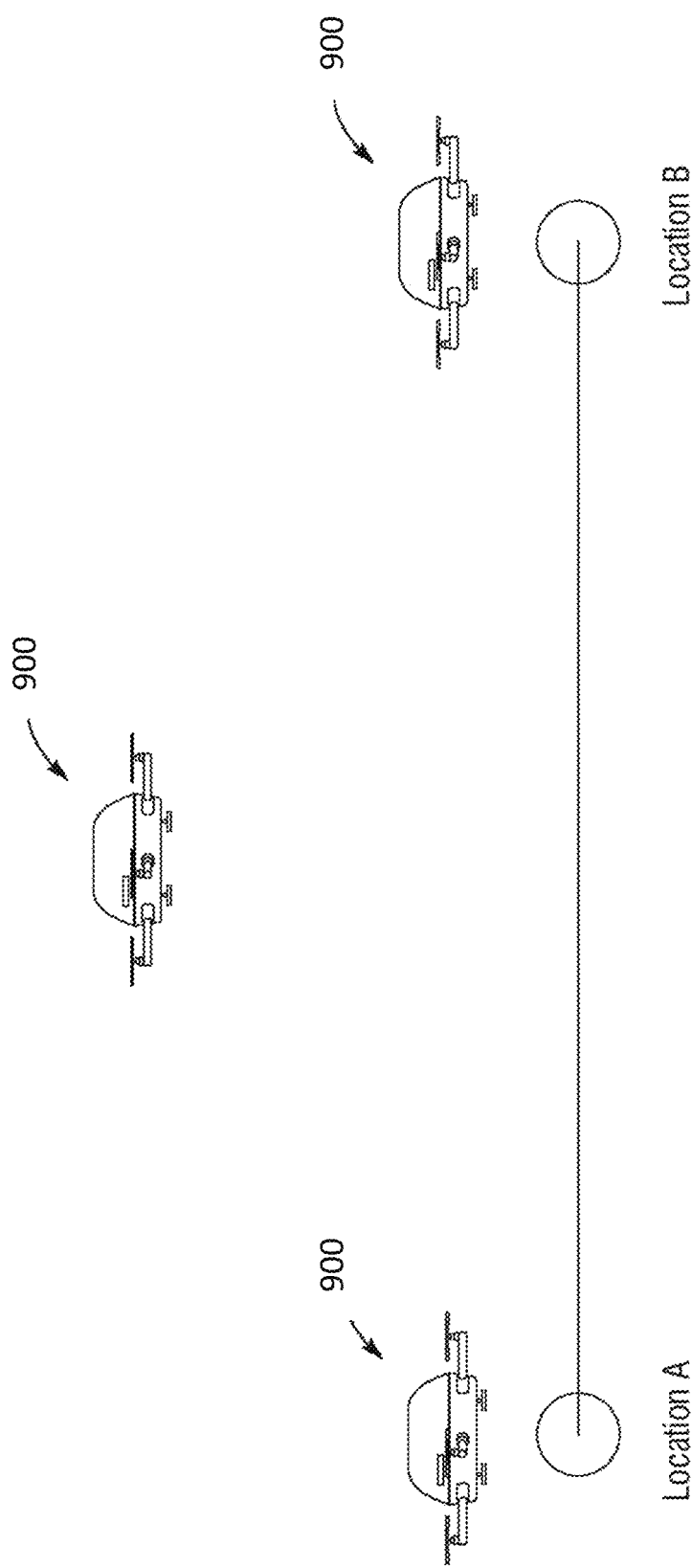
FIG. 12 shows an example flight pattern of a UAV with a hybrid generator system.

FIG. 12 shows an example flight pattern of a UAV with a hybrid generator system 500. In the example flight pattern shown in FIG. 12, the UAV 900, with hybrid system 500 coupled thereto, begins at location A loaded with fuel ready to fly. The UAV 900 then travels from location A to location B and lands at location B. The UAV 900 then uses hybrid system 500 to generate power for local use at location B, thereby acting as a portable flying generator. When power is no longer needed, the UAV 900 returns back to location A and awaits instructions for the next task.

In various embodiments, the UAV 900 uses the power provided by hybrid generator system 500 to travel from an initial location to a remote location, fly, land, and then generate power at the remote location. Upon completion of the task, the UAV 900 is ready to accept commands for its new task. All of this can be performed manually or through an autonomous/automated process. In various embodiments, the UAV 900 with hybrid generator system 500 can be used in an applicable application where carrying fuel and a local power generator are needed. Thus, the UAV 900 with a hybrid generator system 500 eliminates the need to carry both fuel and a generator to a remote location. The UAV 900 with a hybrid generator system 500 is capable of powering both the vehicle when in flight, and when not in flight can provide the same amount of available power to external loads. This may be useful in situations where power is needed for the armed forces in the field, in humanitarian or disaster relief situations where transportation of a generator and fuel is challenging, or in situations where there is a request for power that is no longer available.

Figure 13:
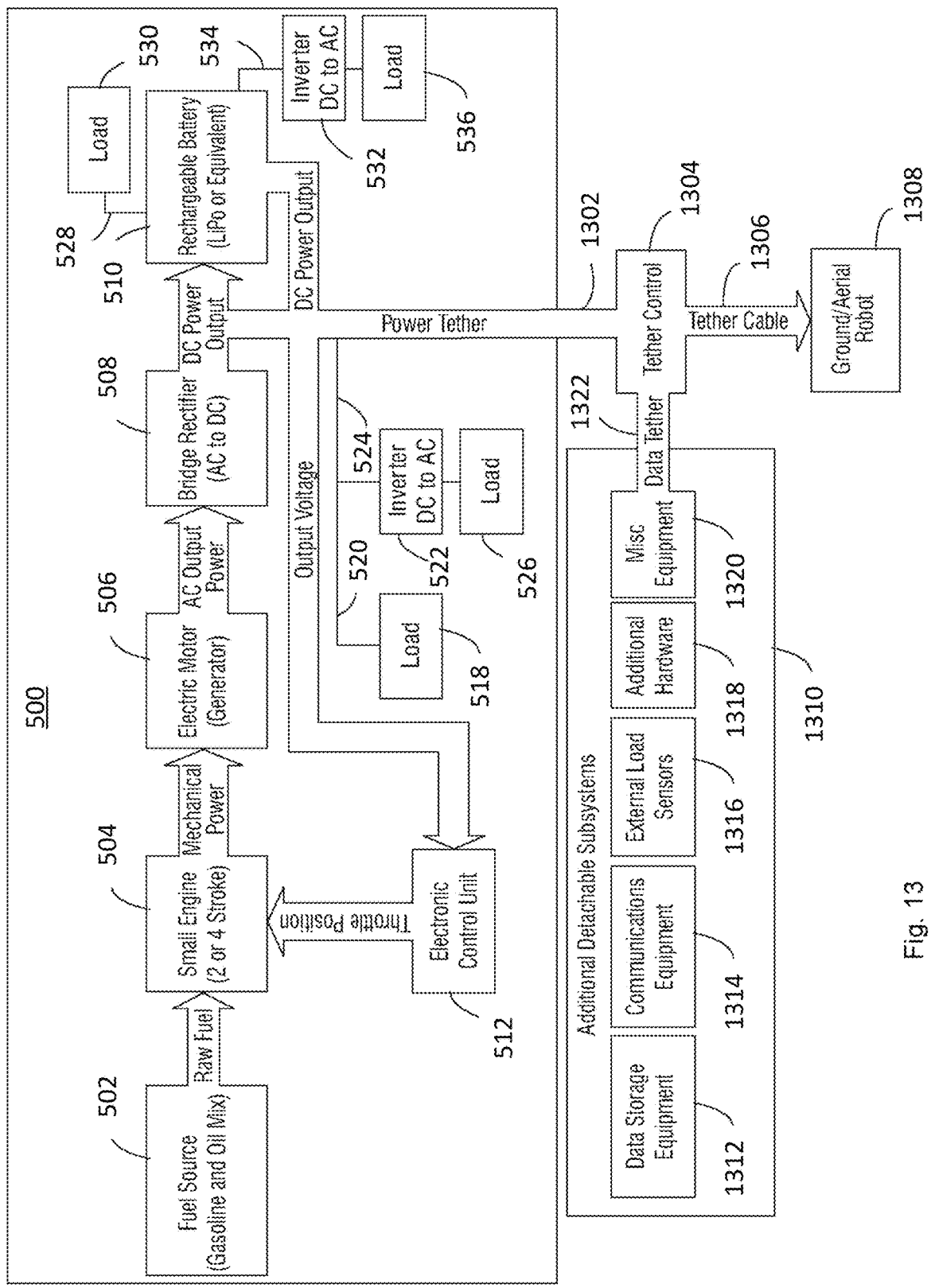
FIG. 13 depicts a diagram of a hybrid generator system with detachable subsystems.

FIG. 13 depicts a diagram of another system for a hybrid generator system 500 with detachable subsystems. FIG. 14A depicts a diagram of a hybrid generator system 500 with detachable subsystems integrated as part of a UAV. FIG. 14B depicts a diagram of a hybrid generator system 500 with detachable subsystems integrated as part of a ground robot. In various embodiments, a tether line 1302 is coupled to the DC output of bride rectifier 508 and rechargeable battery 510 of a hybrid control system 500. The tether line 1302 can provide DC power output to a tether controller 1304. The tether controller 1304 is coupled between a tether cable 1306 and a ground or aerial robot 1308. In operation, as discussed in further detail below, the hybrid generator system 500 provides tethered power to the ground or aerial robot 1308 with the similar output capabilities as discussed above with one or more of the FIGS. in this paper.

The system shown in FIG. 13 can include additional detachable components 1310 integrated as part of the system, e.g., data storage equipment 1312, communications equipment 1314, external load sensors 1316, additional hardware 1318, and various miscellaneous equipment 1320 that can be coupled via data tether 1322 to tether controller 1304.

Figure 14:
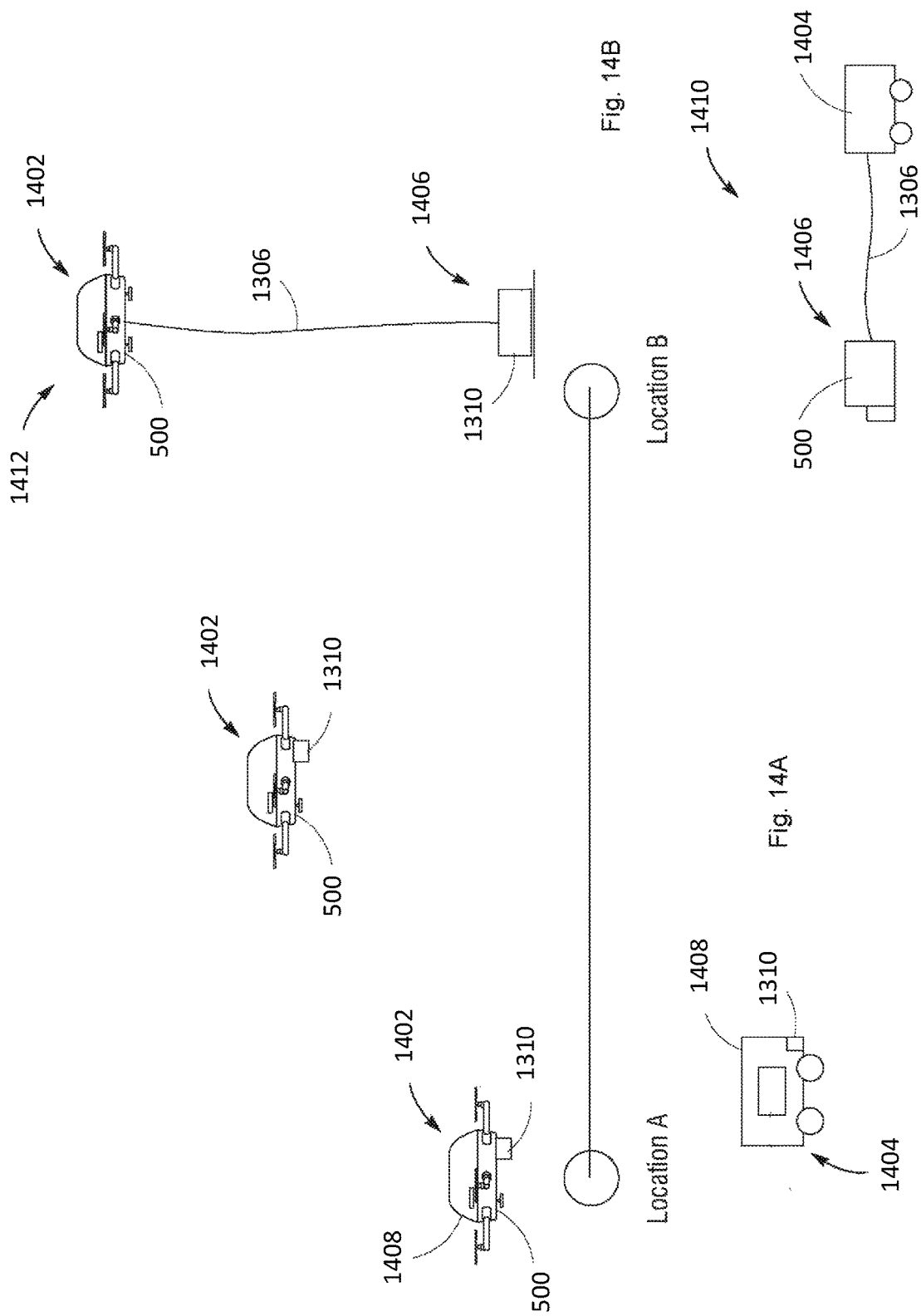
FIG. 14A depicts a diagram of a hybrid generator system with detachable subsystems integrated as part of a UAV.
FIG. 14B depicts a diagram of a hybrid generator system with detachable subsystems integrated as part of a ground robot.

In one example of operation of the system shown in FIG. 13, the system may be configured as part of a flying robot or UAV, such as flying robot or UAV 1402, FIG. 14, or as ground robot 1404. Portable tethered robotic system 1408 starts a mission at location A. All or an applicable combination of the subsystems and ground, the tether controller, ground/aerial robot 1308 can be powered by the hybrid generator system 500. The Portable tethered robotic system 1408 travels either by ground, e.g., using ground robot 1404 powered by hybrid generator system 500 or by air using flying robot or UAV 1402 powered by hybrid generator system 500 to desired remote location B. At location B, portable tethered robotic system 1408 configured as flying robot 1402 or ground robot 1404 can autonomously decouple hybrid generator system 500 and/or detachable subsystem 1310, indicated at 1406, which remain detached while ground robot 1404 or flying robot or UAV 1402 are operational. When flying robot or UAV 1402 is needed at location B, indicated at 1412, flying robot or UAV 1402 can be operated using power provided by hybrid generator system coupled to tether cable 1306. When flying robot or UAV 1402 no longer has hybrid generator system 500 and/or additional components 1310 attached thereto, it is significantly lighter and can be in flight for a longer period of time. In one example, flying robot or UAV 1402 can take off and remain in a hovering position remotely for extended periods of time using the power provided by hybrid generator system 500.

Similarly, when ground robot 1404 is needed at location B, indicated at 1410, it may be powered by hybrid generator system 500 coupled to tether line 1306 and will also be significantly lighter without hybrid generator system 500 and/or additional components 1310 attached thereto. Ground robot 1404 can also be used for extended periods of time using the power provide by hybrid generator system 500.

Figure 15:
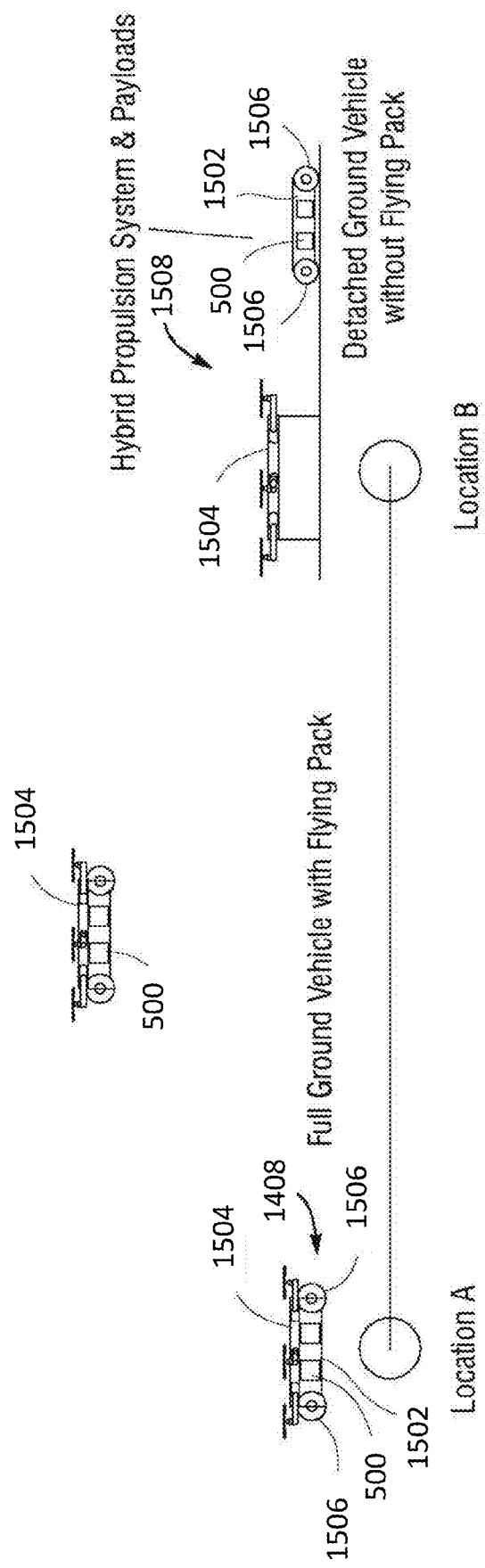
FIG. 15 shows a ground robot with a detachable flying pack in operation.

FIG. 15 shows a ground robot 1502 with a detachable flying pack in operation. The detachable flying pack 1504 includes hybrid generator system 500. The detachable flying pack is coupled to the ground robot 1502 of one or more embodiments. The hybrid generator system 500 is embedded within the ground robot 1502. The ground robot 1502 is detachable from the flying pack 1504. With such a design, a majority of the capability is embedded deep within the ground robot 1502 which can operate 100% independently of the flying pack 1504. When the ground robot 1502 is attached to the flying pack 1504, the flying pack 1504 is powered from hybrid generator system 500 embedded in the ground robot 1502 and the flying pack 1504 provides flight. The ground robot 1502 platform can be a leg wheel or threaded base motion.

In one embodiment, the ground robot 1502 may include the detachable flying pack 1504 and the hybrid generator system 500 coupled thereto as shown in FIG. 15. In this example, the ground robot 1502 is a wheel-based robot as shown by wheels 1506. In this example, the hybrid generator system 10, includes fuel source 502, engine 504, generator motor 506, bridge rectifier 508, rechargeable battery 20, ECU 512, and optional inverters 522 and 532, as discussed above with reference to one or more FIGS. in this paper. The hybrid generator system 500 also preferably includes data storage equipment 1312, communications equipment 1314, external load sensors 1316, additional hardware 1318, and miscellaneous communications 1320 coupled to data line 1322 as shown. The flying pack 1504 is preferably, an aerial robotic platform such as a fixed wing, single rotor or multi rotor, aerial device, or similar type aerial device.

In one embodiment, the ground robot 1502 and the aerial flying pack 1504 are configured as a single unit. Power is delivered the from hybrid generator system 500 and is used to provide power to flying pack 1504, so that ground robot 1502 and flying pack 1504 can fly from location A to location B. At location B, ground robot 1506 detaches from flying pack 1504, indicated at 1508, and is able to maneuver and operate independently from flying pack 1504. Hybrid generator system 500 is embedded in ground robot 1502 such that ground robot 1506 is able to be independently powered from flying pack 1504. Upon completion of the ground mission, ground robot 1502 is able to reattached itself to flying pack 1504 and return to location A. All of the above operations can be manual, semi-autonomous, or fully autonomous.

In one embodiment, flying pack 1504 can traverse to a remote location and deliver ground robot 1502. At the desired location, there is no need for flying pack 1504 so it can be left behind so that ground robot 1502 can complete its mission without having to carry flying pack 1504 as its payload. This may be useful for traversing difficult and challenging terrains, remote locations, and in situations where it is challenging to transport ground robot 1502 to the location. Exemplary applications may include remote mine destinations, remote surveillance and reconnaissance, and package delivery services where flying pack 1504 cannot land near an intended destination. In these examples, a designated safe drop zone for flying pack can be used and local delivery is completed by ground robot 1502 to the destination.

In various embodiments, then a mission is complete, ground robot 1404 or flying robot or UAV 1402 can be autonomously coupled back to hybrid generator system 500. Additional detachable components 1310 can auto be autonomously coupled back hybrid generator system 500. Portable tethered robotic system 1408 with a hybrid generator system 500 configured a flying robot or UAV 1402 or ground robot 1404 then returns to location A using the power provided by hybrid generator system 500.

The result is portable tethered robotic system 1408 with a hybrid generator system 500 is able to efficiently transport ground robot 1404 or flying robot or UAV 1402 to remote locations, automatically decouple ground robot 1404 or flying robot or UAV 1402, and effectively operate the flying robot 1402 or ground robot 1404 using tether power where it may be beneficial to maximize the operation time of the ground robot 1402 or flying robot or UAV 1404. System 1408 provides modular detachable tethering which may be effective in reducing the weight of the tethered ground or aerial robot thereby reducing its power requirements significantly. This allows the aerial robot or UAV or ground robot to operate for significantly longer periods of time when compared to the original capability where the vehicle components are attached and the vehicle needs to sustain motion. System 1408 eliminates the need to assemble a generator, robot and tether at remote locations and therefore saves time, resources, and expense. Useful applications of system 1408 may include, inter alia, remote sensing, offensive or defensive military applications and/or communications networking, or multi-vehicle cooperative environments, and the like.

Figure 16:
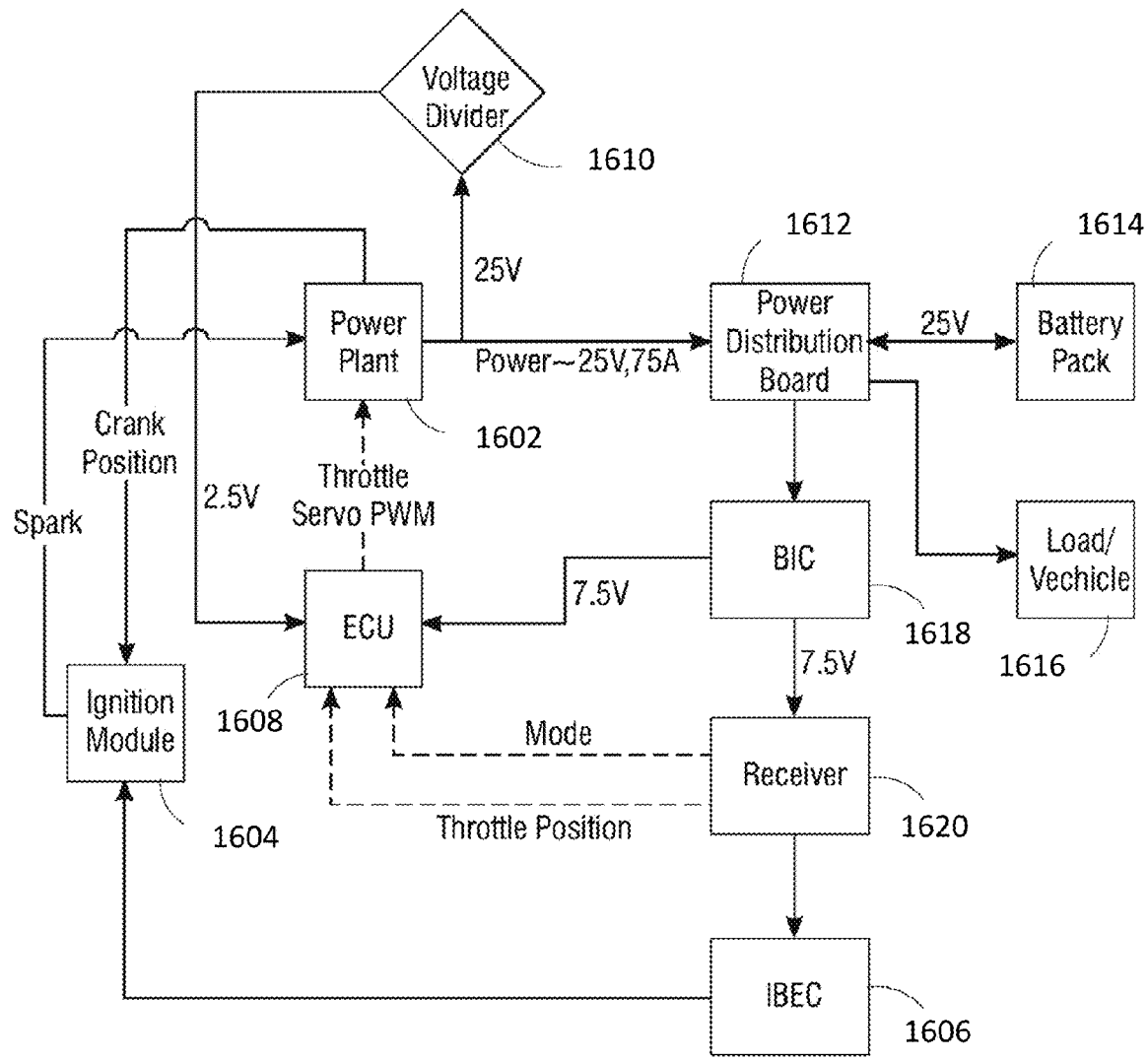
FIG. 16 shows a control system of a hybrid generator system.

FIG. 16 shows a control system of a hybrid generator system. The hybrid generator system includes a power plant 1602 coupled to an ignition module 1604. The ignition module 1604 functions to start the power plant 1602 by providing a physical spark to the power plant 1604. The ignition module 1604 is coupled to an ignition battery eliminator circuit (IBEC) 1606. The IBEC 1606 functions to power the ignition module 1604.

The power plant 1602 is configured to provide power. The power plant 1602 includes an engine and a generator. The power plant is controlled by the ECU 1608. The ECU 1608 is coupled to the power plant through a throttle servo. The ECU 1608 can operate the throttle servo to control a throttle of an engine to cause the power plant 1602 to either increase or decrease an amount of produced power. The ECU 1608 is coupled to a voltage divider 1610. Through the voltage divider 1610, the ECU can determine an amount of power the ECU 1608 is generating to determine whether to increase, decrease, or keep a throttle of an engine constant.

The power plant is coupled to a power distribution board 1612. The power distribution board 1612 can distribute power generated by the power plant 1602 to either or both a battery pack 1614 and a load/vehicle 1616. The power distribution board 1612 is coupled to a battery eliminator circuit (BEC) 1618. The BEC 1618 provides power to the ECU 1608 and a receiver 1620. The receiver 1620 controls the IBEC 1606 and functions to cause the IBEC 1606 to power the ignition module 1604. The receiver 1620 also sends information to the ECU 1608 used in controlling a throttle of a engine of the power plant 1602. The receiver 1620 to the ECU information related to a throttle position of a throttle of an engine and a mode in which the hybrid generation system is operating.

Figure 17:
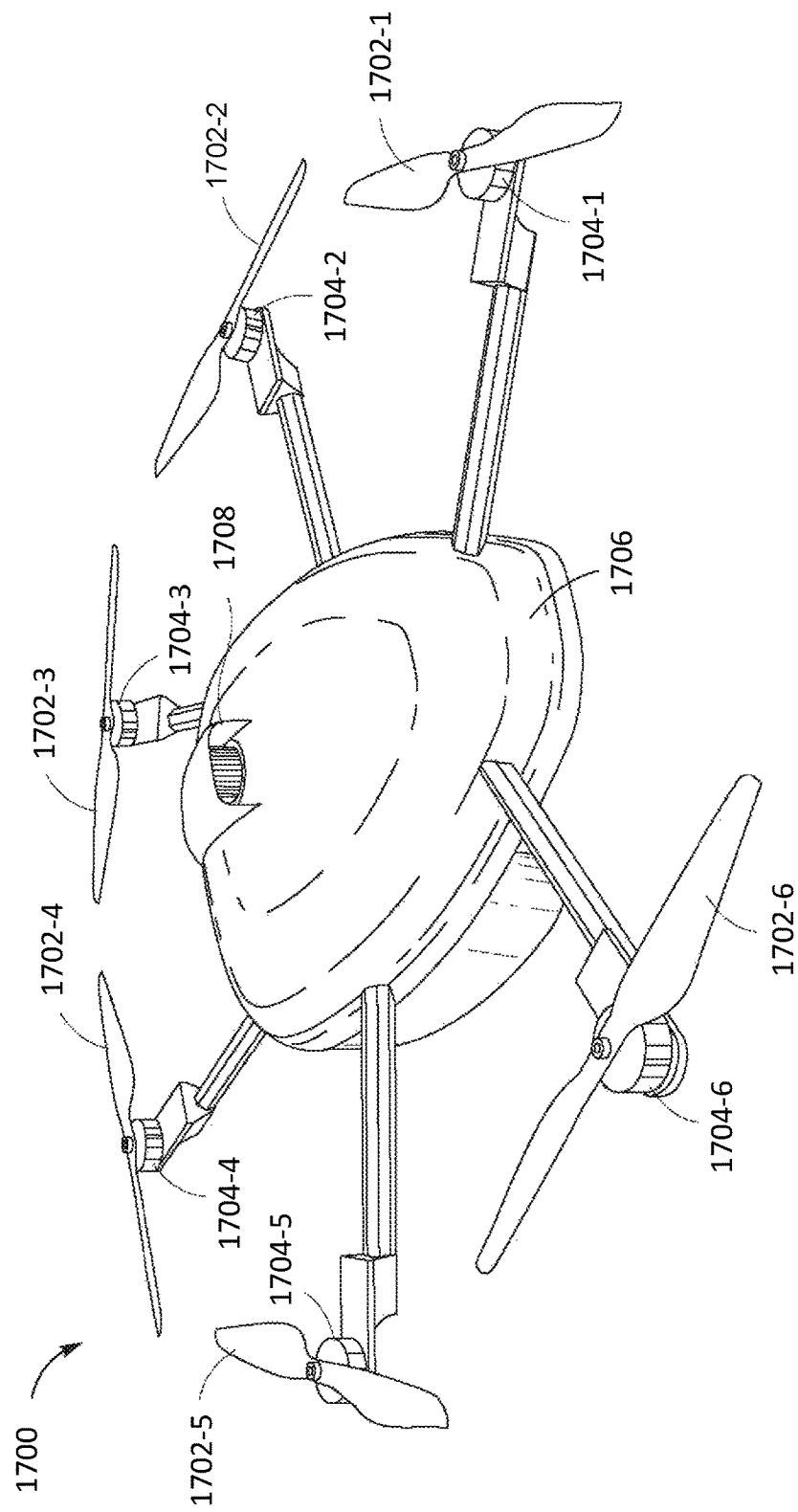
FIGS. 17-19 are diagrams of a UAV.

FIG. 17 shows a top perspective view of a top portion 1700 of a drone powered through a hybrid generator system. The top portion 1700 of the drone shown in FIG. 13 includes six rotors 1702-1 . . . 1702-6 (hereinafter "rotors 1702"). The rotors 1702 are caused to spin by corresponding motors 1704-1 . . . 1704-6 (hereinafter "motors 1704"). The motors 1704 can be powered through a hybrid generator system. The top portion 1700 of a drone includes a top surface 1706. Edges of the top surface 1706 can be curved to reduce air drag and improve aerodynamic performance of the drone. The top surface includes an opening 1708 through which air can flow to aid in dissipating heat away from at least a portion of a hybrid generator system. In various embodiments, at least a portion of an air filter is exposed through the opening 1708.

Figure 18:
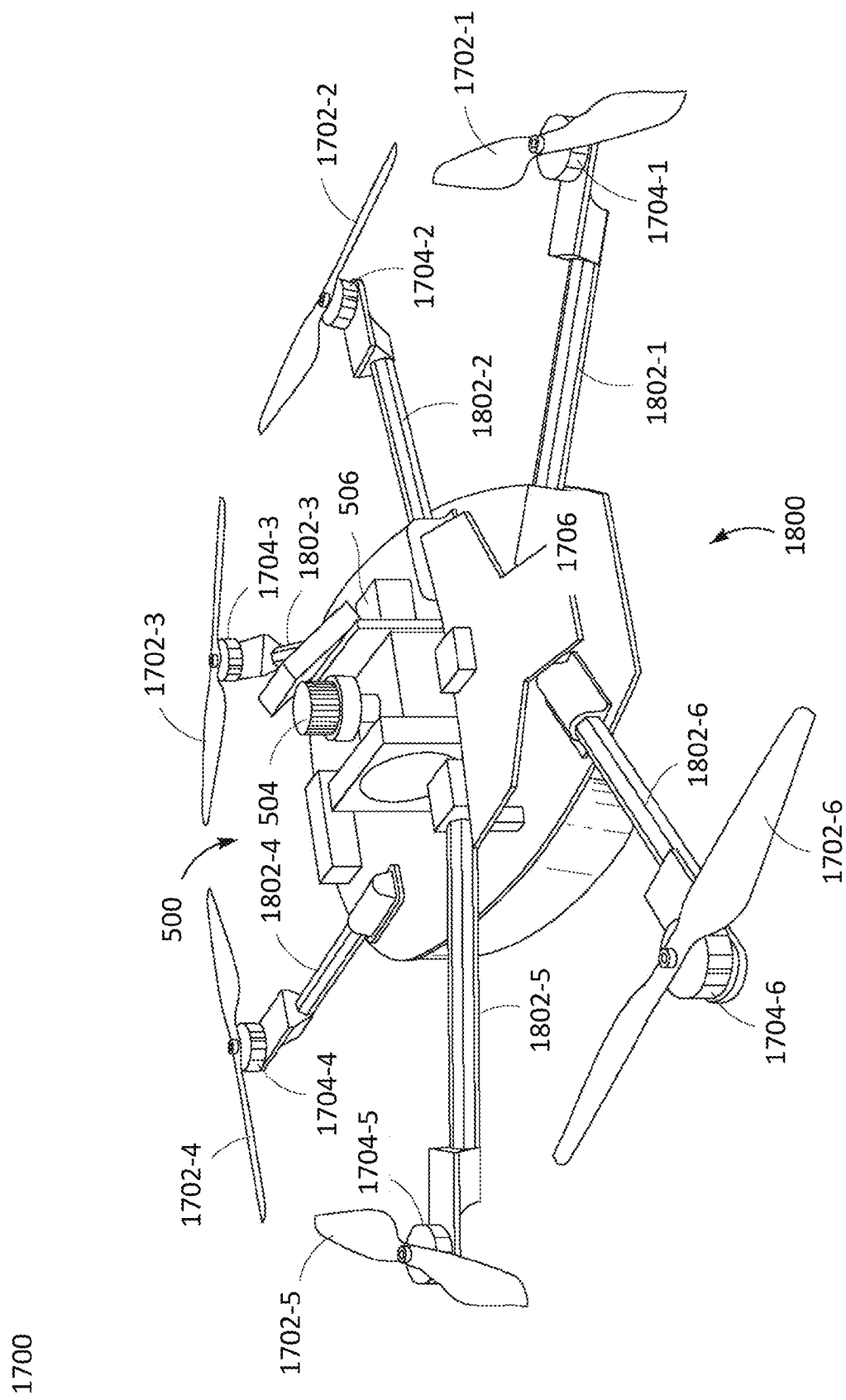

FIG. 18 shows a top perspective view of a bottom portion 1800 of a drone powered through a hybrid generator system 500. The hybrid generator system 500 includes an engine 504 and a generator motor 506 to provide power to motors 1704. The rotor motors 1704 and corresponding rotors 1702 are positioned away from a main body of a bottom portion 1800 of the drone through arms 1802-1 . . . 1802-6 (hereinafter "arms 1802"). An outer surface of the bottom portion of the bottom portion 1800 of the drone and/or the arms 1802 can have edges that are curved to reduce air drag and improve aerodynamic performance of the drone.

Figure 19:
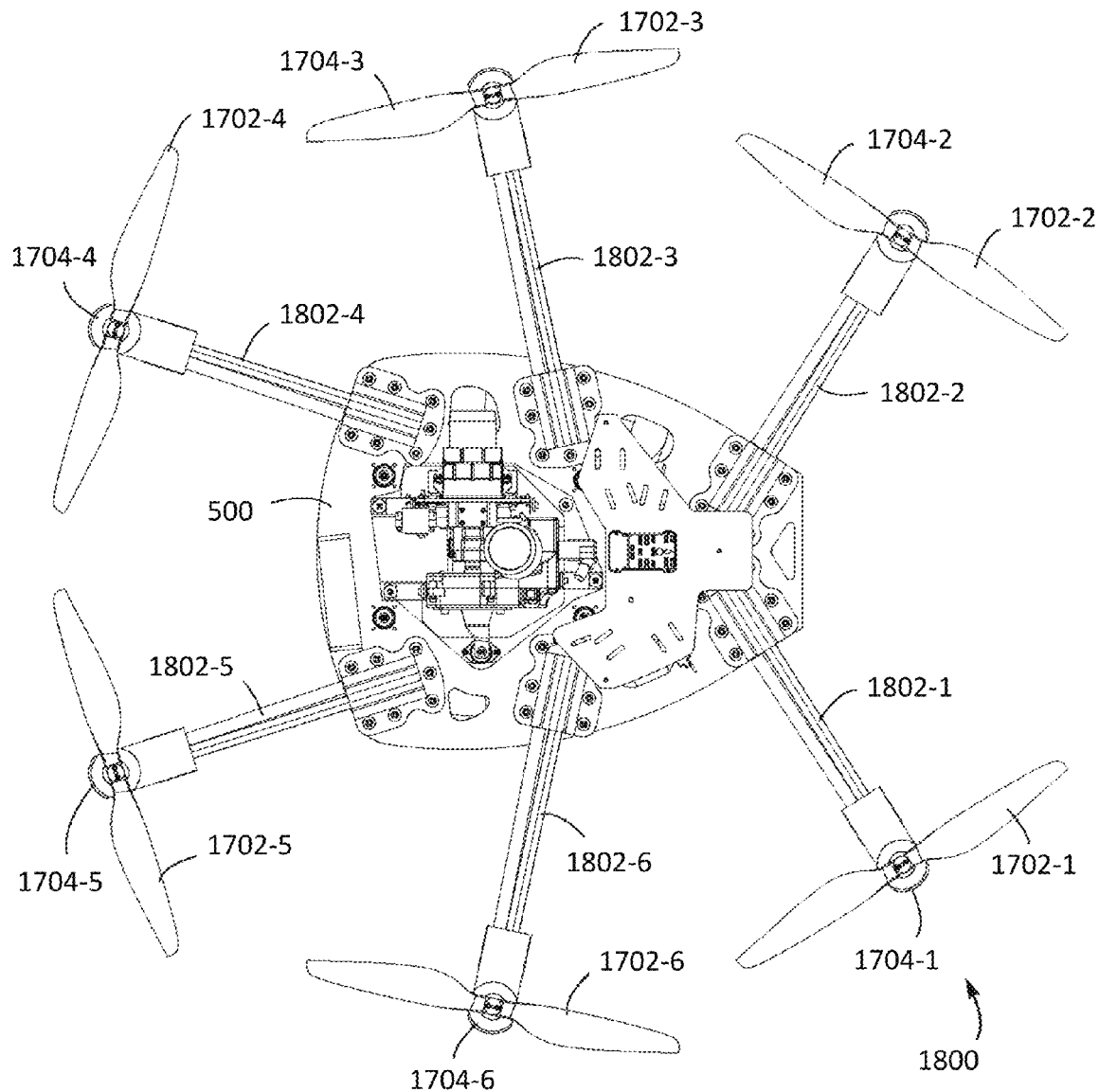

FIG. 19 shows a top view of a bottom portion 1800 of a drone powered through a hybrid generator system 500. The rotor motors 1704 and corresponding rotors 1702 are positioned away from a main body of a bottom portion 1800 of the drone through arms 1802. An outer surface of the bottom portion of the bottom portion 1800 of the drone and/or the arms 1802 can have edges that are curved to reduce air drag and improve aerodynamic performance of the drone.

Figure 20:
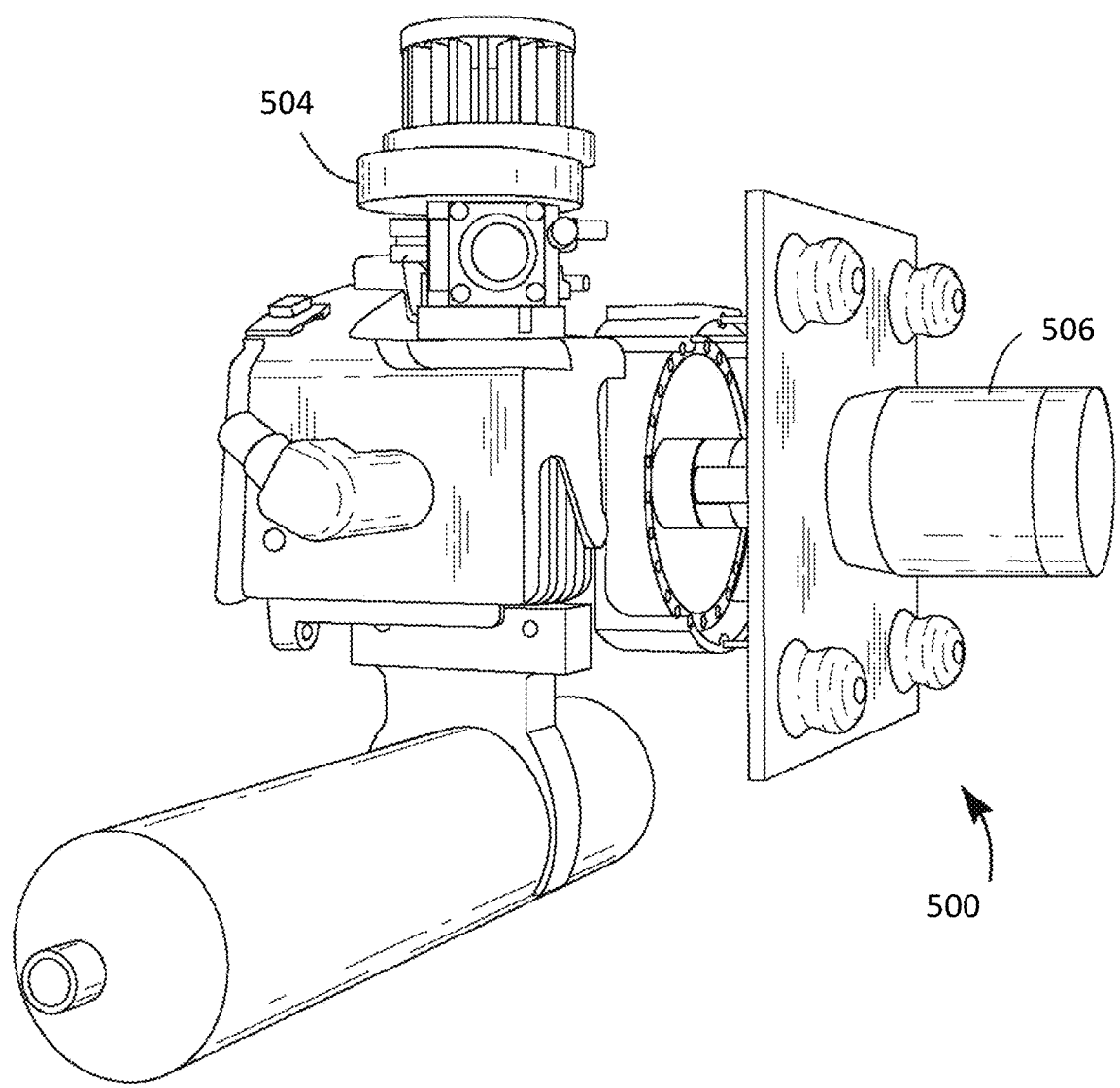
FIGS. 20 and 21 are diagrams of portions of a hybrid generator system.

FIG. 20 shows a side perspective view of a hybrid generator system 500. The hybrid generator system 500 shown in FIG. 16 is capable of providing 1.8 kW of power. The hybrid generator system 500 include an engine 504 coupled to a generator motor 506. The engine 504 can provide approximately 3 horsepower. The generator motor 506 functions to generate AC output power using mechanical power generated by the engine 504.

Figure 21:
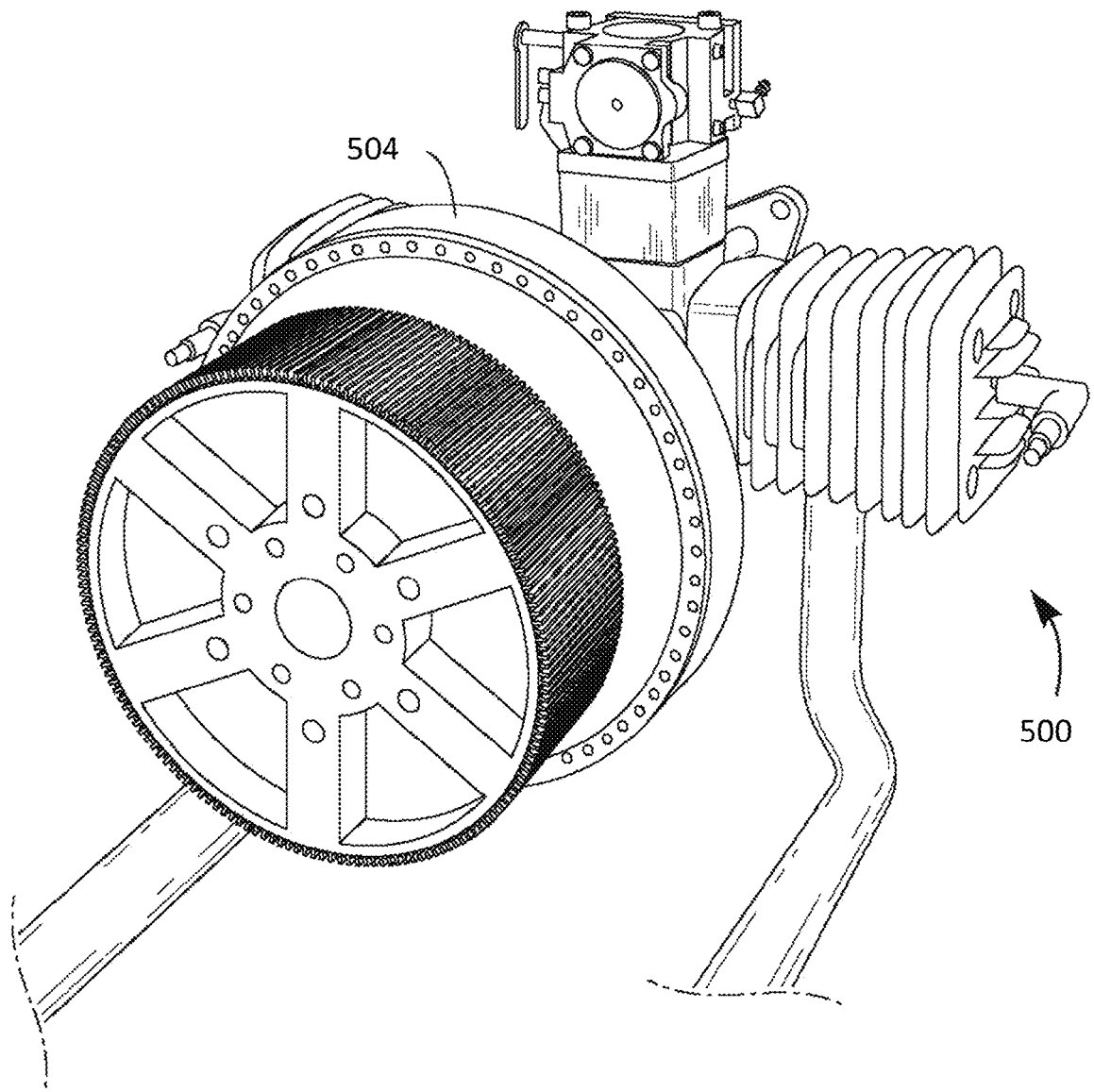

FIG. 21 shows a side perspective view of a hybrid generator system 500. The hybrid generator system 500 shown in FIG. 17 is capable of providing 10 kW of power. The hybrid generator system 500 include an engine 504 coupled to a generator motor. The engine 504 can provide approximately 15-16.5 horsepower. The generator motor functions to generate AC output power using mechanical power generated by the engine 504.

Further description of UAVs and hybrid generator systems can be found in U.S. application Ser. No. 14/942,600, the contents of which are incorporated here by reference in their entirety.

In some examples, the engine 504 can include features that enable the engine to operate with high power density. The engine 504 can be a two-stroke engine having a high power-to-weight ratio. The engine 504 can embody a simply design with a small number of moving parts such that the engine is small and light, thus contributing to the high power-to-weight ratio of the engine. In a specific example, the engine has an energy density of 1 kW/kg (kilowatt per kilogram) and generates about 10 kg of lift for every kilowatt of power generated by the engine. In some examples, the engine 504 can be a brushless motor, which can contribute to achieving a high power density of the engine. A brushless motor is efficient and reliable, and is generally not prone to sparking, thus reducing the risk of electromagnetic interference (EMI) from the engine.

In some examples, the engine 504 is mounted on the UAV via a vibration isolation system that enables sensitive components of the UAV and data center to be isolated from vibrations generated by the engine. Sensitive components of the UAV can include, e.g., an inertial measurement unit such as Pixhawk, a compass, a global positioning system (GPS), or other components. Sensitive components of the data center can include, e.g., processors, data storage devices, wireless communications components, or other components.

In some examples, the vibration isolation system can include vibration damping mounts that attach the engine to the frame of the UAV. The vibration damping mounts allow for the engine 504 to oscillate independently from the frame of the UAV, thus preventing vibrations from being transmitted from the engine to other components of the UAV. The vibration damping mounts can be formed from a robust, energy absorbing material such as rubber, that can absorb the mechanical energy generated by the motion of the engine without tearing or ripping, thus preventing the mechanical energy from being transferred to the rest of the UAV. In some examples, the vibration damping mounts can be formed of two layers of rubber dampers joined together rigidly with a spacer. The length of the spacer can be adjusted to achieve a desired stiffness for the mount. The hardness of the rubber can be adjusted to achieve desired damping characteristics in order to absorb vibrational energy.

Referring to FIG. 22A, in some examples, the engine 504 and the generator motor 506 are directly coupled through a precise and robust connection, e.g., through a urethane coupling 704. In particular, the generator motor 506 includes a generator rotor 706 and a generator stator 708 housed in a generator body 2202. The generator rotor 706 is attached to the generator body 2202 by generator bearings 2204. The generator rotor 706 is coupled to an engine shaft 606 via the coupling 704. Precision coupling between the engine 504 and the generator motor 506 can be achieved by using precisely machined parts and balancing the weight and support of the rotating components of the generator motor 506, which in turn reduces internal stresses. Alignment of the rotor of the generator with the engine shaft can also help to achieve precision coupling. Misalignment between the rotor and the engine shaft can cause imbalances that can reduce efficiency and potentially lead to premature failure. In some examples, alignment of the rotor with the engine shaft can be achieved using precise indicators and fixtures. Precision coupling can be maintained by cooling the engine 504 and generator motor 506, by reducing external stresses, and by running the engine 504 and generator motor 506 under steady conditions, to the extent possible. For instance, the vibration isolation mounts allow external stresses on the engine 504 to be reduced or substantially eliminated, assisting in achieving precision direct coupling.

Direct coupling can contribute to the reliability of the first power system, which in turn enables the hybrid generator system to operate continuously for long periods of time at high power. In addition, direct coupling can contribute to the durability of the first power system, thus helping to reduce mechanical creep and fatigue even over many engine cycles, such as millions of engine cycles. In some examples, the engine is mechanically isolated from the frame of the UAV by the vibration isolation system and thus experiences minimal external forces, so the direct coupling between the engine and the generator motor can be implemented by taking into account only internal stresses.

Direct coupling between the engine 504 and the generator motor 506 can enable the first power system to be a compact, lightweight power system having a small form factor. A compact and lightweight power system can be readily integrated into the UAV.

Figure 22B:
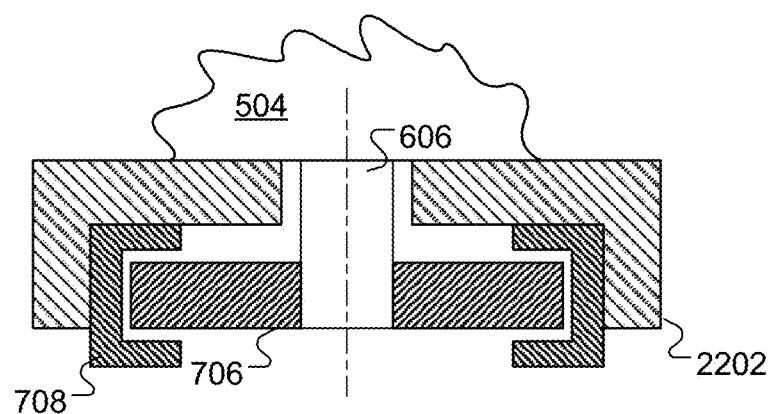
Figure 23:
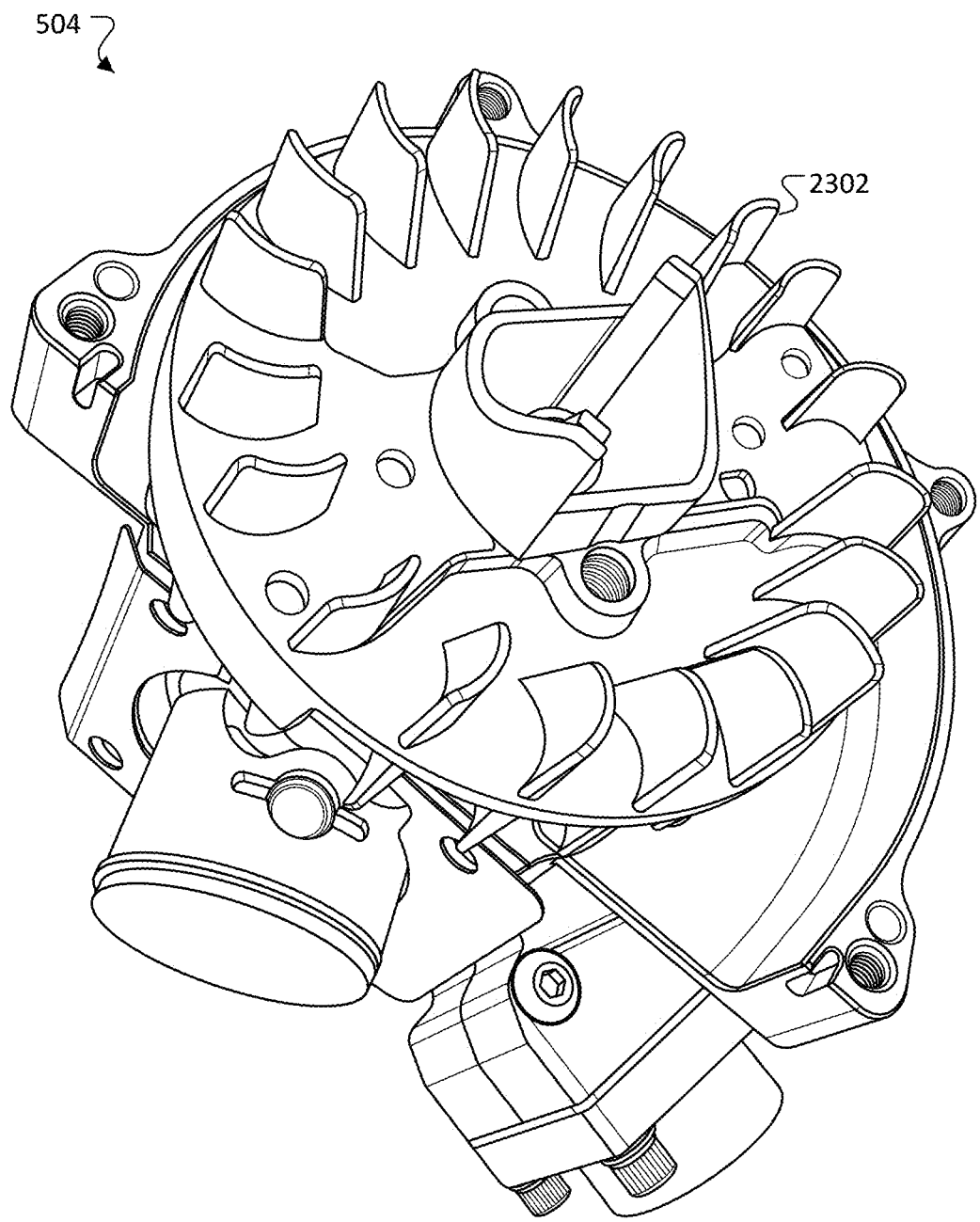
FIG. 23 is a diagram of a portion of an engine.

Referring to FIG. 22B, in some examples, a frameless or bearing-less generator 608 can be used instead of a urethane coupling between the generator motor 506 and the engine 504. For instance, the bearings (2204 in FIG. 22A) on the generator can be removed and the generator rotor 706 can be directly mated to the engine shaft 606. The generator stator 708 can be fixed to a frame 610 of the engine 516. This configuration prevents over-constraining the generator with a coupling while providing a small form factor and reduced weight and complexity.

In some examples, the generator motor 506 includes a flywheel that provides a large rotational moment of inertia. A large rotational inertia can result in reduced torque spikes and smooth power output, thus reducing wear on the coupling between the engine 504 and the generator motor 506 and contributing to the reliability of the first power system. In some examples, the generator, when mated directly to the engine 504, acts as a flywheel. In some examples, the flywheel is a distinct component, e.g., if the generator does not provide enough rotary inertia.

In some examples, design criteria are set to provide good pairing between the engine 504 and the generator motor 506. The power band of a motor is typically limited to a small range. This power band can be used to identify an RPM (revolutions per minute) range within which to operate under most flight conditions. Based on the identified RPM range, a generator can be selected that has a motor constant (kV) that is able to provide the appropriate voltage for the propulsion system (e.g., the rotors). The selection of an appropriate generator helps to ensure that the voltage out of the generator will not drop as the load increases. For instance, if the engine has maximum power at 6500 RPM, and a 50 V system is desired for propulsion, then a generator can be selected that has a kV of 130.

In some examples, exhaust pipes can be designed to positively affect the efficiency of the engine 504. Exhaust pipes serve as an expansion chamber for exhaust from the engine, thus improving the volumetric efficiency of the engine. The shape of the exhaust pipes can be tuned to guide air back into the combustion chamber based on the resonance of the system. In some examples, the carburetor can also be tuned based on operating parameters of the engine, such as temperature or other parameters. For instance, the carburetor can be tuned to allow a desired amount of fuel into the engine, thus enabling a target fuel to air ratio to be reached in order to achieve a good combustion reaction in the engine. In addition, the throttle body can be designed to control fuel injection and/or timing in order to further improve engine output.

In some examples, the throttle of the engine can be regulated in order to achieve a desired engine performance. For instance, when the voltage of the system drops under a load, the throttle is increased; when the voltage of the system becomes too high, the throttle is decreased. The bus voltage can be regulated and a feedback control loop used to control the throttle position. In some examples, the current flow into the battery can be monitored with the goal of controlling the charge of the battery and the propulsion voltage. In some examples, feed forward controls can be provided such that the engine can anticipate upcoming changes in load (e.g., based on a mission plan and/or based on the load drawn by the motor) and preemptively compensates for the anticipated changes. Feed forward controls enable the engine to respond to changes in load with less lag. In some examples, the engine can be controlled to charge the battery according to a pre-specified schedule, e.g., to maximize battery life, in anticipation of loads (e.g., loads forecast in a mission plan), or another goal. Throttle regulation can help keep the battery fully charged, helping to ensure that the system can run at a desired voltage and helping to ensure that backup power is available.

In some examples, ultra-capacitors can be incorporated into the hybrid generator system in order to allow the hybrid generator system to respond quickly to changing power demands. For instance, ultra-capacitors can be used in conjunction with one or more rechargeable batteries to provide a lightweight system capable of rapid response and smooth, reliable power.

In some examples, thermal management strategies can be employed in order to actively or passively cool components of the hybrid generator system. High power dense components tend to overheat, e.g., because thermal dissipation is usually proportional to surface area. In addition, internal combustion is an inherently inefficient process, which creates heat.

Active cooling strategies can include fans, such as a centrifugal fan. The centrifugal fan can be coupled to the engine shaft so that the fan spins at the same RPM as the engine, thus producing significant air flow. The centrifugal fan can be positioned such that the air flow is directed over certain components of the engine, e.g., the hottest parts of the engine, such as the cylinder heads. Air flow generated by the flying motion of the UAV can also be used to cool the hybrid generator system. For instance, air pushed by the rotors of the UAV (referred to as propwash) can be used to cool components of the hybrid generator system. Passive cooling strategies can be used alone or in combination with active cooling strategies in order to cool components of the hybrid generator system. In some examples, one or more components of the hybrid generator system can be positioned in contact with dissipative heat sinks, thus reducing the operating temperature of the components. For instance, the frame of the UAV can be formed of a thermally conductive material, such as aluminum, which can act as a heat sink. Referring to FIG. 22, in some examples, fins 2302 can be formed on the engine (e.g., on one or more of the cylinder heads of the engine) to increase the convective surface area of the engine, thus enabling increased heat transfer. In some examples, the hybrid generator system can be configured such that certain components are selectively exposed to ambient air or to air flow generated by the flying motion of the UAV in order to further cool the components.

In some examples, the materials of the hybrid generator system 10, the UAV, and/or the data center components can be lightweight. For instance, materials with a high strength to weight ratio can be used to reduce weight. Example materials can include aluminum or high strength aluminum alloys (e.g., 7075 alloy), carbon fiber based materials, or other materials. Component design can also contribute to weight reduction. For instance, components can be designed to increase the stiffness and reduce the amount of material used for the components. In some examples, components can be designed such that material that is not relevant for the functioning of the component is removed, thus further reducing the weight of the component.

In some examples, a UAV powered by a hybrid generator system can act as a transportation system to carry one or more humans or animals, e.g., weighing up to about 100 kg. For instance, the UAV can act as a transportation system for short distance point-to-point transportation or inter-island transportation, e.g., between islands in Japan, Hawaii, the Philippines, or other regions having closely spaced islands.

In some examples, a UAV powered by a hybrid generator system can be collapsible, e.g., to fit into an enclosed space. For instance, the UAV can fold into a shape sufficient to fit into a 40 cm×5 cm×5 cm tube and deployed from the tube to act as an expandable weather reconnaissance device, such as a National Center for Atmospheric Research (NCAR) dropsonde.

In some examples, multiple UAVs each powered by a hybrid generator system can be deployed as a fleet from a base, such as a ship (e.g., a cargo ship), to conduct measurement or information gathering activities. For instance, the fleet of UAVs can collect information about the location of schools of fish to guide the course of fishing vessels. The fleet of UAVs can collect information about ice level reduction in Artic or Antarctic regions. Other information or measurements can be collected by the fleet of UAVs.

In some examples, a UAV powered by a hybrid generator system can be used to deliver cargo to a distribution center at a port. For instance, a cargo ship may anchor at a location nearby but outside of the port, and the UAV can transfer cargo from the ship to the port. The ship can thus avoid the time consuming exercise of arriving to and docking at the port. In addition, the use of UAVs as cargo unloading devices can enable shallow water ports to receive deliveries from large cargo ships that otherwise may be constrained to arrive only at deep water ports.

In some examples, a UAV powered by a hybrid generator can be used as a portable weather system, such as a wind and/or weather sensor. The UAV can be moved as a probe through one or more layers of the atmosphere. The dynamics of a multirotor UAV can make the multirotor UAV more sensitive, e.g., to air or wind conditions, than other types of weather probes. In some examples, built in logging information from an avionics system of the UAV can be used to determine inertial data from the UAV and to compare with flight controller signals used to compensate for wind and to provide stability to motors and/or propellers.

In some examples, a portable launch system can be provided to launch UAVs powered by hybrid generator systems, e.g., for use as weather probes. The UAVs can be reloadable, disposable devices. The launch system can be loaded with the UAV, which can be launched into the atmosphere, e.g., by local or remote control. The UAV can collect atmospheric data as it descends through the atmosphere. The collected data can be stored in a memory of the UAV or can be transmitted in real time, e.g., via radio, satellite, telecommunications networks (e.g., LTE networks), or other communications protocols.

In some examples, a flight stand provides a platform for testing of UAVs. The flight stand allows for safe testing while providing a real, in-air testing environment. The flight stand includes vertical rails that constrain lateral movement of a UAV being tested therein while allowing for free vertical movement.

In some examples, analytic approaches can be used for analysis of performance and/or mission plans for a UAV.

In some examples, detection systems can be deployed, e.g., to detect intrusion of UAVs into a certain airspace. The detection systems can apply mathematic and/or probabilistic approaches to determining whether an unwarranted UAV is present in a certain location. In some examples, radio frequency (RF) detection can be used, e.g., through a distributed network of RF sensors that can be used to triangulate RF signals typically used by UAVs. In some examples, audio detection or visual detection through a distributed network of audio sensors or visual sensors, respectively, can be used. In some examples, spectral detection through a spectrum of operations can be used. In some examples, UAVs can apply countermeasures to thwart detection, such as RF jamming, GPS jamming, wideband jamming, spectral jamming, physical nets, or other countermeasures. The detection systems can take into account possible countermeasures in order to trigger or prioritize methods of detection and countering in order to enhance the likelihood that an unwarranted UAV instruction can be detected.

Figure 24:
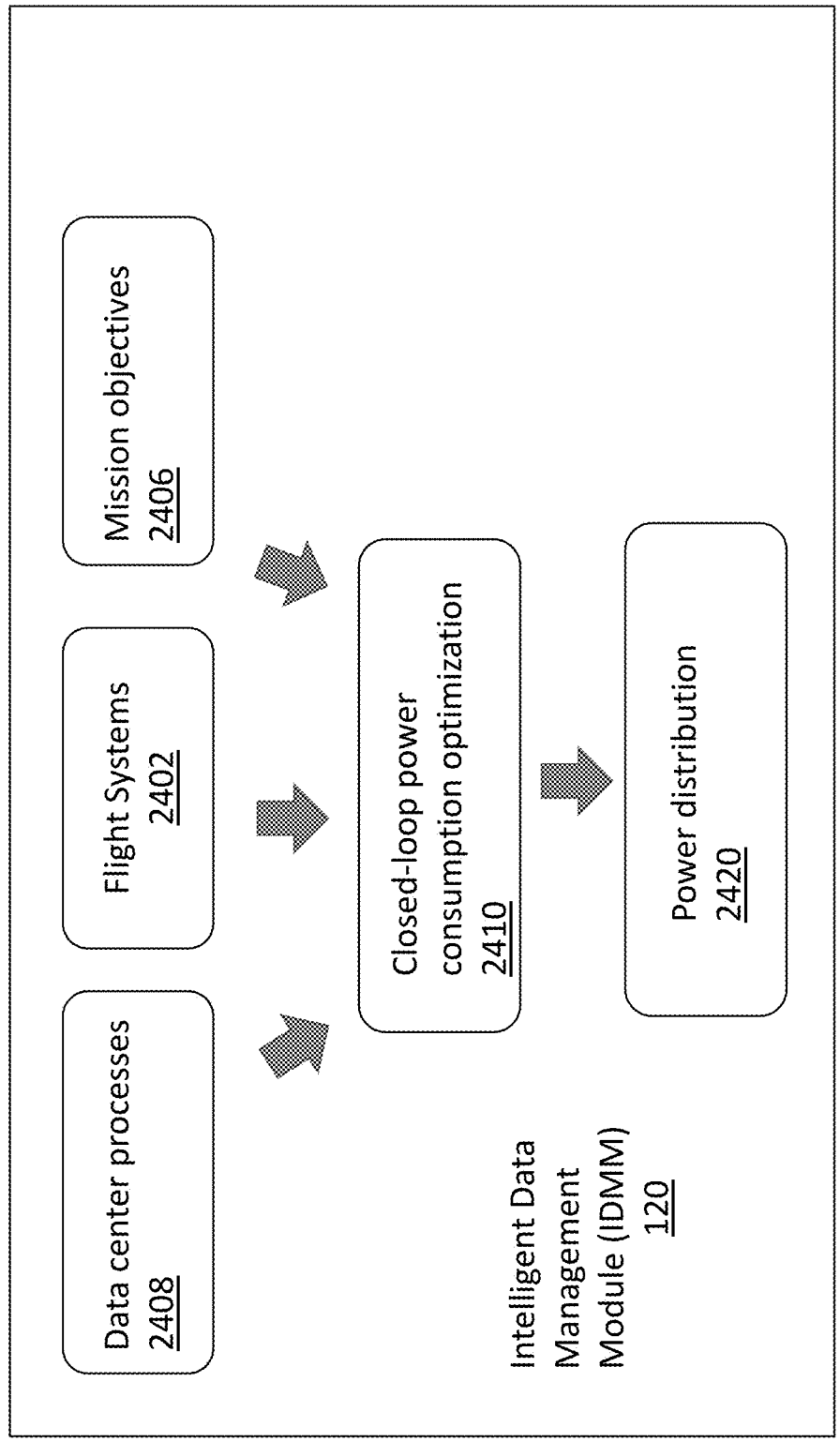
FIG. 24 is an illustration of a closed-loop power management system.

FIG. 24 is an illustration of a closed-loop power management system implemented by an intelligent data management module 120 of the data center 104. The intelligent data management module 120 employs a closed-loop power consumption optimization algorithm 2410 to implement one aspect of the constrained resource optimization. The optimization algorithm 2410 enables power distribution in a smart way, by taking, as inputs, one or more of the condition of the flight system 2402 (e.g., power generation), the mission objectives 2406 stored in the data storage 106, and the condition of the data center processing tasks 2408. Based on the inputs, 2408, 2402, 2406, the optimization algorithm 2410 determines a power distribution 2420 for current data processing tasks. In some instances, the optimization algorithm 2410 also considers future data center processing tasks that may be prescribed by the mission objectives 2406 and determines a power distribution 2420 for current processing tasks and future processing tasks that may change of order of execution of certain tasks based on the expected condition of the flight systems 2402 necessary to complete the mission objectives 2406. For example, take-off and hovering are both energy intensive flight system conditions. During those flight conditions, the optimization algorithm 2410 may reduce and/or halt less critical or unnecessary data center processing unless or until the power usage of the flight system is reduced (e.g., forward flight). In some instances, the optimization algorithm 2410 is able to determine, based on the mission objectives 2406, when certain flight conditions are going to occur and the priority of specific tasks during those flight conditions (e.g., image collection while hovering over target location) and prioritize certain mission critical tasks based on the mission objectives (e.g., deferring image processing and transmission to an upcoming forward flight condition when the UAV 100 is in transit to the next target location).

In some examples, the intelligent data management module is executed by a processor on board the UAV. In some examples, the intelligent data management module is executed by a processor remote from the UAV, such as a processor at a ground-based computing facility or a processor on board another UAV. In some examples, the intelligent data management module is executed in a distributed manner by multiple processors on board the UAV, by multiple processors remote from the UAV, and/or by one or more processors on board the UAV and one or more processors remote from the UAV.

For example, a UAV 100 mission objective includes performing a mapping survey using a LIDAR sensor, and the LIDAR data collection is power intensive for the data center 104. The prioritization determined by the optimization algorithm 2410 might result in data being collected when the UAV is hovering in the mapping region, because the mapping is an essential part of the mission, but data processing being performed when UAV 100 is in forward flight, which is less power intensive than hovering. In some instances, the optimization algorithm 2410 can take into account the percentage of processing power used by various parallel processing tasks and a priority of each task based on the mission objectives 2406. Based on the percentages and priorities, the optimization algorithm can develop a power distribution 2420 that allocates processing power to each of the parallel processing tasks based on their priority of the available power at a present time.

In some instances, the optimization algorithm 2410 employs machine learning to adjust the present power distribution 2420 based on future power requirements, which may be calculated based on the expected flight system condition as determined by the mission objectives. For example, if a mission objective 2406 of the UAV 100 is collecting image data at multiple targets, processing the image data, and transmitting the image data, a basic optimization algorithm 2410 may prioritize the data collection while the UAV 100 hovers over the target site and reduce or pause the data processing and transmission until more power become available, because the image collection is the critical task at the target site. The image processing is a secondary task that can be deferred by the optimization algorithm 2410 until more power is available to the data center 104, e.g., until the UAV 100 is no longer hovering. If flight conditions change (e.g., the weather changes and the UAV 100 draws more energy to complete the flight profile of the mission objective) a more advanced optimization algorithm 2410 is responsive to the change in available power and, for example, reduces the data collection sampling rate. A reduction in the data sampling rate can reduce the power usage by the data collection devices and can also result in less data being collected, thus making it more likely that the data is able to processed during the forward flight segment to the next target even given the reduced amount of available power. In this example, the completion of all three tasks (i.e., data collection, processing, and transmission) are considered a single task for each target location. The optimization algorithm 2410 is configured to evaluate a single mission task across multiple flight segments, and adjust the processing of individual components based on the present available power and/or the expected available power during future flight segments of that task. In other instances, a mission objective 2406 may prioritize data processing over a particular flight segment or operation, and, for example, the optimization algorithm 2410 may reduce the flight speed of the UAV 100 in order to complete a processing task that is prioritized higher than the flight speed in that particular mission objective 2406.

Figure 25:
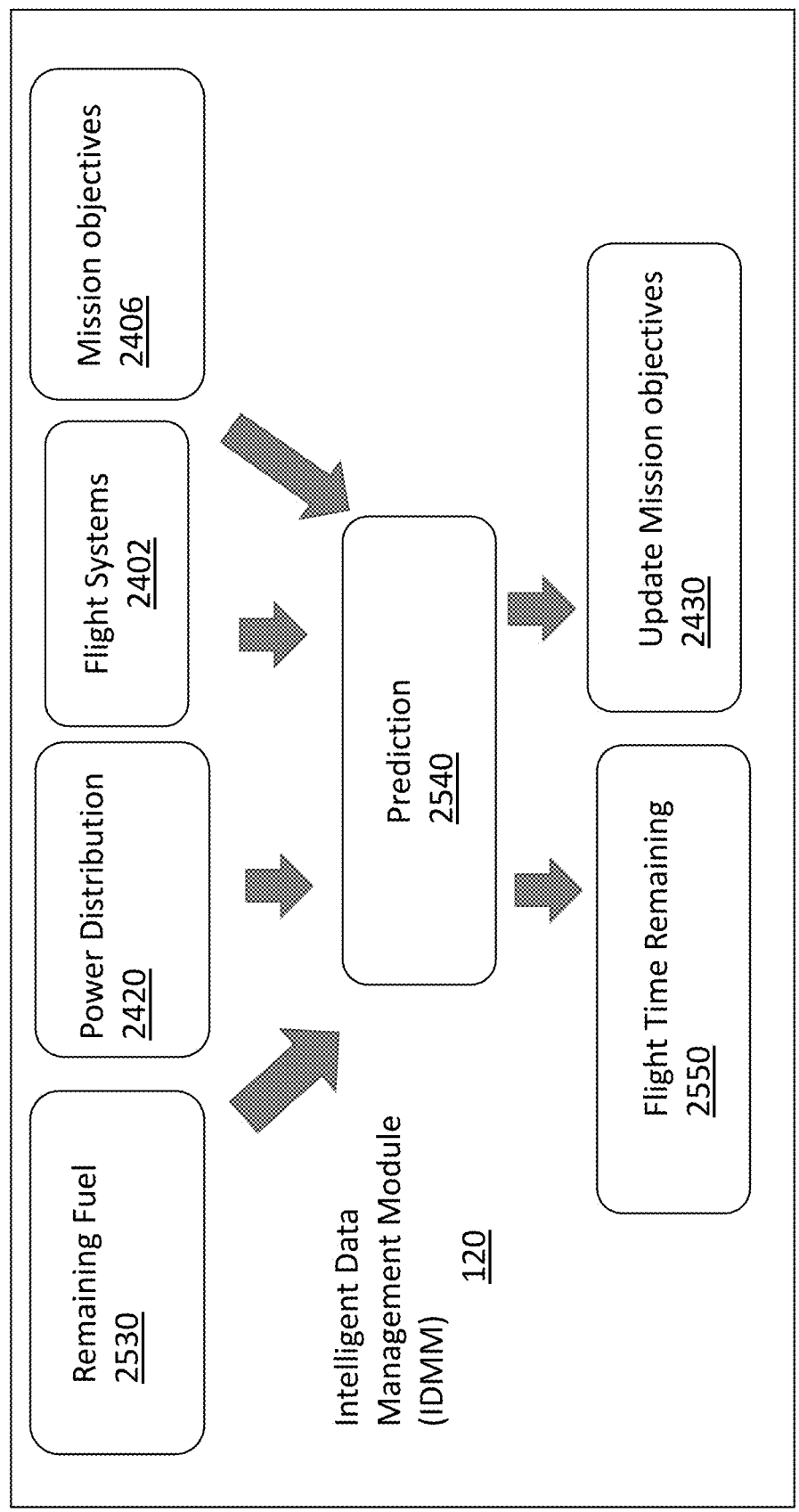
FIG. 25 is an illustration of a prediction system.

In some instances, as illustrated in FIG. 25, for the optimization algorithm 2410 to calculate future power consumption, the IDMM includes a prediction algorithm 2540 to determine the remaining flight time 2550 (e.g., future power consumption) of the UAV 100 based on the mission objectives 2406, the power distribution 2420, the flight system 2402, and/or the remaining fuel 2530. The prediction algorithm 2540 is used to estimate future fuel consumption based on the current conditions of the UAV (e.g., both the fuel consumption of the fight systems 2402, and the power consumption of the data center 104), the remaining fuel 2530, and an estimation of both the future power consumption and resulting fuel consumption based on the mission objective 2406.

The mission objectives 2406, in some instances, include expected fuel consumption and energy generation rates for flight segments of the mission objectives 2406. The prediction algorithm 2540 compares the expected fuel consumption (and energy generation) of the flight systems to the present fuel consumption and flight system 2402 and updates 2430 the expected fuel consumption of the mission objectives 2406 based on the comparison. If no expected fuel consumption is present in the mission objective 2406, the prediction algorithm 2540 populates fuel consumption for predicting the fuel consumption of future flight segments or predicts future fuel consumption based on past fuel consumption. For example, if the mission objective is hover and collect data, the prediction algorithm 2540 records the present fuel consumption of the flight system 2402 and the present power distribution 2420 to the data center 104, and, based on the remaining fuel 2530, calculates the flight time remaining 2550. In another example, the mission objective 2406 includes forward flight between two points, with a hover at each point, the prediction algorithm 2540 uses the flight system 2402 after the first forward flight and first hover to predict the fuel consumption of the future forward flight and hovers. The prediction algorithm 2540 can then update 2430 the mission objectives to store the fuel consumption of the flight segments, and calculate the flight time remaining 2550 based on the updated fuel consumption, the power distribution 2420, and the remaining fuel 2530. In yet another example, the future flight segments may be unknown because they are responsive to future commands or determined based on collected data, and the prediction algorithm 2540 uses techniques known in the art (e.g., weighted averages) over recent past flight segments to estimate future fuel consumption and, along with the power distribution and remaining fuel 2530, calculates the flight time remaining 2550. In other instances, the prediction algorithm 2540 estimates future power distribution 2420 based on past power distribution and the mission objectives 2406 and predicts the flight time remaining 2550 based on the estimated future power distribution 2420.

Figure 26:
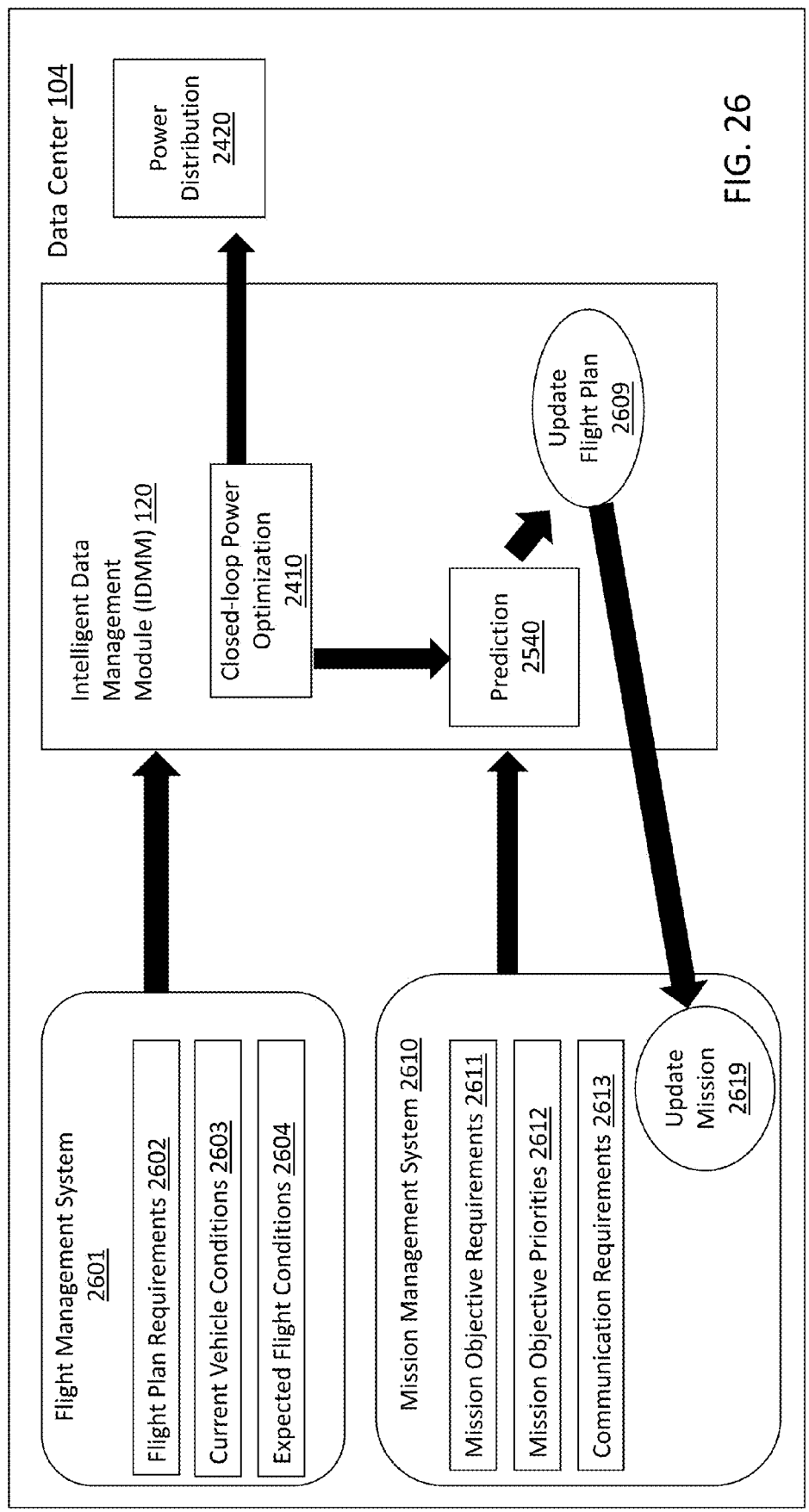
FIG. 26 is an illustration of the operation of an intelligent data management module.

FIG. 26 is an illustration of the operation of an intelligent data management module 120 in a data center 104 of a UAV 100. The data center 104 includes a flight management system (FMS) 2601, a mission management system (MMS) 2610, and the intelligent data management module (IDMM)

120 configured to control the power distribution of to the processes and devices of the data center 104, as detailed above. The FMS 2601 includes flight plan criteria 2602, which may include a flight and mission plan having time-tagged waypoints that the UAV 100 will fly, including a profile between each way point indicating altitude, speed, and heading, for example. The FMS 2601 also includes the current vehicle condition 2603, which may include the current flight mode, the current available power level for the data center 104, and/or the current fuel level and battery charge status, or other indicators of vehicle condition. The FMS, in some instances, also includes the expected flight conditions 2604 including any expected environment conditions such as wind speeds, humidity, precipitation, to be expected along the waypoints or generally in the area of the UAV 100. The MMS 2610 includes mission objective criteria 2611, which may be mission activities to take place, such as when and which payload sensor will be activated to take data, when and how data will be processed, and when and how data will be stored. The MMS 2610 also includes the mission objective priorities 2612, which may include what data is to be processed or collected and in what order. Also, the MMS 2610 includes communication criteria 2613 indicative of when and where, and what data is to be sent to another UAV or an operating command center, e.g., via a wireless communication module.

In operation, the IDMM 120, as detailed above, receives information from the FMS 2601 and the MMS 2610 and executes a closed-loop power optimization control algorithm 2410 to generate power distribution 2420 scheme for allocating the power resources of the data center 104 based on at least the current vehicle conditions 2603 and the mission objective priorities 2612. Additionally, the IDMM includes a prediction algorithm 2540 which, based on the power distribution 2420, and the data received from the FMS 2601 and the MMS 2610, as detailed above, estimates the remaining flight time for the UAV 100 as it carries out the mission objective criteria 2611 while traveling along the flight plan criteria 2602. Based on the prediction of remaining flight time, the IDMM can determine if the flight plan criteria 2602 are able to be met based on the remaining fuel and, if not, update 2609 the flight plan based on the remaining flight time. The MMS 2610 or the IDMM 120, based on the prediction that the flight plan criteria are unable to be met, may updates the mission criteria 2611 to under to maintain the flight plan criteria 2602 or modify the flight plan criteria 2602 in order to maintain the mission criteria.

Figure 27:
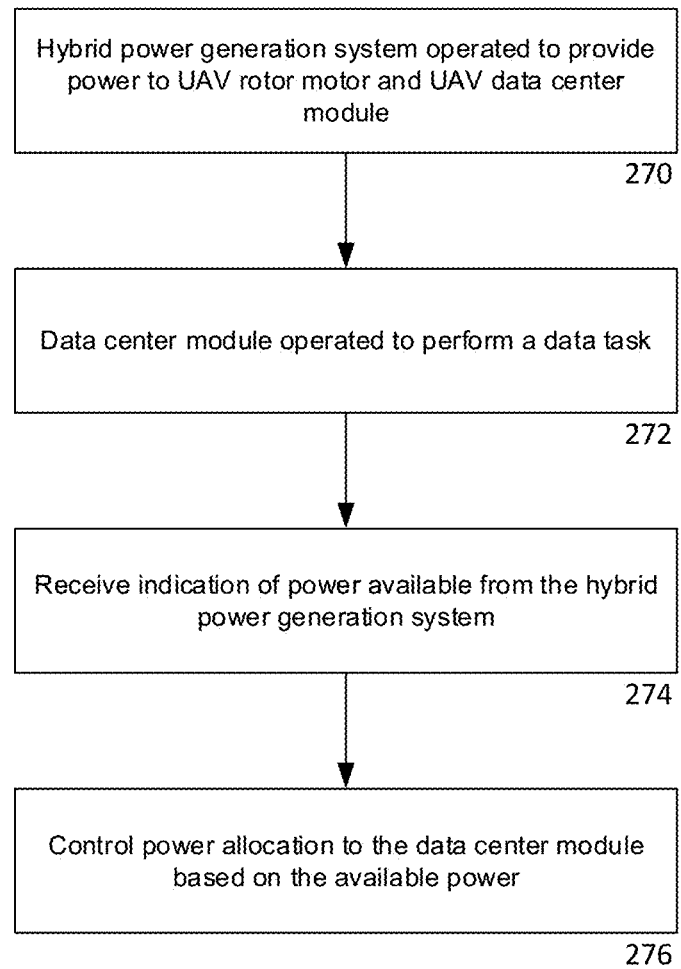
FIG. 27 is a flow chart.

Referring to FIG. 27, in an example, a hybrid power generation system is operated to provide power to a rotor motor of an unmanned aerial vehicle and to a data center module of the unmanned aerial vehicle (270). The hybrid power generation system can include a rechargeable battery configured to provide power to the rotor motor and/or to the data center module. The hybrid power generation system can include an engine configured to generate mechanical power. The hybrid power generation system can also include a generator motor coupled to the engine and configured to generate electrical power from the mechanical power generated by the engine.

The data center module is operated (272) to perform a data task using the power provided to the data center module from the hybrid power generation system. The data task includes one or more of data processing and data collection.

An indication of the power available from the hybrid power generation system is received (274). The available power can be dependent on factors such as a flight mode of the unmanned aerial vehicle (e.g., take-off, landing, hovering, forward flight, etc.), environmental conditions (e.g., wind speed, precipitation, etc.), or other factors. A power allocation to the data center module is controlled based on the indication of the power available (276). In some examples, the power allocation to the data center module is controlled further based on a priority measure of the data task, such as whether the data task is high priority or location-specific. For instance, if the amount of available power is below a threshold, a small amount of power or no power is allocated to the data center module unless the data task performed by the data center module is a high priority task or a location-specific task. In some examples, the power allocation is further controlled based on an estimated remaining flight time, e.g., determined based on an amount of fuel remaining.

Other embodiments are within the scope of the following claims.

We claim:

1. An unmanned aerial vehicle comprising:
   at least one rotor motor configured to drive at least one propeller to rotate;
   a data center comprising:
      a processor;
      a data storage component; and
      a wireless communications component;
   a hybrid generator system configured to provide power to the at least one rotor motor and to the data center, the hybrid generator system comprising:
      a rechargeable battery configured to provide power to the at least one rotor motor;
      an engine configured to generate mechanical power; and
      a generator motor coupled to the engine and configured to generate electrical power from the mechanical power generated by the engine; and
   a controller configured to control power consumption by the data center based on the power available from the hybrid generator system.

2. The unmanned aerial vehicle of claim 1, wherein the wireless communications component is configured to communicate with a separate aerial vehicle comprising a wireless communication component and a processor and operate as a node in a mesh network including the unmanned aerial vehicle and the separate aerial vehicle.

3. The unmanned aerial vehicle of claim 2, wherein the unmanned aerial vehicle and the separate aerial vehicle are configured to share data to form a cloud computing cluster.

4. The unmanned aerial vehicle of claim 1, wherein the wireless communications component is configured to communicate with a ground-based device comprising a wireless communication component and a process and operate as a node in a mesh network including the unmanned aerial vehicle and the ground-based wireless communication device.

5. The unmanned aerial vehicle of claim 4, wherein the unmanned aerial vehicle and the ground-based device are configured to share data to form a cloud computing cluster.

6. The unmanned aerial vehicle of claim 1, comprising a sensor configured to collect data, and wherein the data storage component is configured to store the data collected by the sensor.

7. The unmanned aerial vehicle of claim 6, where the sensor includes one or more of the following: a weather sensor, a temperature sensor, a pressure sensor, and a camera.

8. The unmanned aerial vehicle of claim 6, wherein the processor is configured to process the collected data.

9. The unmanned aerial vehicle of claim 1, wherein the data center is configured to execute a data task and wherein the controller is configured to control a power consumption of the data center allocated for the data task based on the power available from the hybrid power generation system.

10. The unmanned aerial vehicle of claim 9, wherein the data storage component is configured to store data indicative of one or more mission objectives and wherein the controller is configured to control the power consumption of the data center allocated for the data task based on the power available from the hybrid power generation system and the stored data indicative of the one or more mission objectives.

11. The unmanned aerial vehicle of claim 10, wherein the data indicative of the one or more mission objectives comprises at least one of: a data processing task, a data collection task, and a flight profile, and wherein the controller is configured to control the power consumption of the data center based on the data indicative of the one or more mission objectives and the power available from the hybrid power generation system.

12. The unmanned aerial vehicle of claim 9, wherein the controller is configured to control the power consumption of the data center allocated for the processing task based on one more of the following:
a flight mode;
a vehicle fuel level; and
a battery status.

13. The unmanned aerial vehicle of claim 9, wherein the controller is configured to control the power consumption of the data center by delaying the performance of the data task until the power available from the hybrid power generation system increases.

14. A method comprising:
operating a hybrid power generation system to provide power to a rotor motor of an unmanned aerial vehicle and to a data center module of the unmanned aerial vehicle;
operating the data center module to perform a data task using the power provided to the data center module, the data task including one or more of data processing and data collection;
receiving an indication of the power available from the hybrid power generation system; and
controlling a power allocation to the data center module based on the indication of the power available.

15. The method of claim 14, comprising:
receiving a priority measure of the data task, and
wherein controlling the power allocation to the data center module is further based on the priority measure of the data task.

16. The method of claim 15, comprising determining the priority measure of the data task.

17. The method of claim 15, wherein the data task is a first data task having a first priority measure, the method comprising:
operating the data center module to perform a second data task using the power provided to the data center module, the first and second data tasks consuming respective first and second amounts of power; and
controlling the power allocation to the data center module for the first and second data tasks based on the indication of the power available and a priority measure of the second data task and the priority measure of the first data task.

18. The method of claim 17, comprising:
receiving a mission objective including one or more of: a flight plan for the unmanned aerial vehicle and a list of one or more data tasks to be performed by the data center module during the flight plan; and
estimating the remaining flight time of the unnamed vehicle based on the fuel status, the generator system status, the power allocation, and the mission objective.

19. The method of claim 17, comprising:
updating one or more of the flight plan and the list of one or more data tasks based on the estimated remaining flight time.

20. The method of claim 17, comprising:
controlling the power allocation based on the estimated remaining flight time.

21. The method of claim 14, comprising:
receiving a fuel status representing an amount of fuel in the unmanned vehicle, the fuel being used to power the hybrid power generation system;
receiving an indication of an amount of power provided to the rotor motor; and
estimating the remaining flight time of the unmanned aerial vehicle based on the fuel status, the indication of the amount of power provided to the rotor motor, and the power allocation.

22. A system for operating an unmanned aerial vehicle, the system comprising:
a propulsion system configured to provide lift and propulsion for the unmanned aerial vehicle;
a flight management system configured to control the propulsion system;
a data center module configured to execute one or more data tasks, each data task including one or more of data processing and data collection;
a mission management system configured to provide instruction to the flight management system for flying the unmanned aerial vehicle and to control operation of the data center module;
hybrid power generation system configured to provide power to the propulsion system and to the data center module; and
an intelligent data management system configured to be responsive to the flight management system and the mission management system to control the allocation of power to the data center module based on a priority of each data tasks and an availability of the power from the hybrid power generation system.

23. The system of claim 22, where the hybrid generator system comprises:
a rechargeable battery configured to provide the power to the propulsion system;
an engine configured to generate mechanical power; and
a generator motor coupled to the engine and configured to generate the electrical power from the mechanical power generated by the engine.

* * * * *

UNITED STATES PATENT AND TRADEMARK OFFICE
CERTIFICATE OF CORRECTION

PATENT NO. : 9,902,495 B2
APPLICATION NO. : 15/594255
DATED : February 27, 2018
INVENTOR(S) : Long N. Phan et al.

Page 1 of 1

It is certified that error appears in the above-identified patent and that said Letters Patent is hereby corrected as shown below:

In the Claims

Column 29, Line 23, Claim 12:
After "one" insert -- or --.

Column 30, Line 10 (approx.), Claim 18:
Delete "unnamed" and insert -- unmanned --, therefor.

Signed and Sealed this
Twenty-sixth Day of June, 2018

Andrei Iancu
*Director of the United States Patent and Trademark Office*